(12) United States Patent
Subramanian et al.

(10) Patent No.: US 10,452,441 B1
(45) Date of Patent: Oct. 22, 2019

(54) DETERMINING AN ALLOCATION OF COMPUTING RESOURCES FOR A JOB

(71) Applicant: Accenture Global Solutions Limited, Dublin (IE)

(72) Inventors: Revathi Subramanian, San Diego, CA (US); Vijay Desai, San Diego, CA (US); Qiang Song, San Diego, CA (US); Bryan Johns, Coronado, CA (US); Paul Boynton, Encinitas, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/160,560

(22) Filed: Oct. 15, 2018

(51) Int. Cl.
  *G06F 9/46* (2006.01)
  *G06F 9/50* (2006.01)
  *G06Q 10/06* (2012.01)
  *G06N 20/00* (2019.01)

(52) U.S. Cl.
  CPC ............ *G06F 9/5005* (2013.01); *G06N 20/00* (2019.01); *G06Q 10/06313* (2013.01)

(58) Field of Classification Search
  None
  See application file for complete search history.

(56) References Cited

U.S. PATENT DOCUMENTS

2012/0173717 A1* 7/2012 Kohli ................ G06F 11/3006 709/224
2013/0138816 A1* 5/2013 Kuo ..................... G06F 9/5011 709/226

* cited by examiner

*Primary Examiner* — Wissam Rashid
(74) *Attorney, Agent, or Firm* — Harrity & Harrity, LLP

(57) ABSTRACT

A device may receive a computing resource request. The computing resource request may be related to allocating computing resources for a job. The device may process the computing resource request to identify a set of parameters related to the computing resource request or to the job. The set of parameters may be used to determine an allocation of the computing resources for the job. The device may utilize multiple machine learning models to process data related to the set of parameters identified in the computing resource request. The device may determine the allocation of the computing resources for the job based on utilizing the multiple machine learning models to process the data. The device may generate a set of scripts related to causing the computing resources to be allocated for the job according to the allocation. The device may perform a set of actions based on the set of scripts.

20 Claims, 14 Drawing Sheets

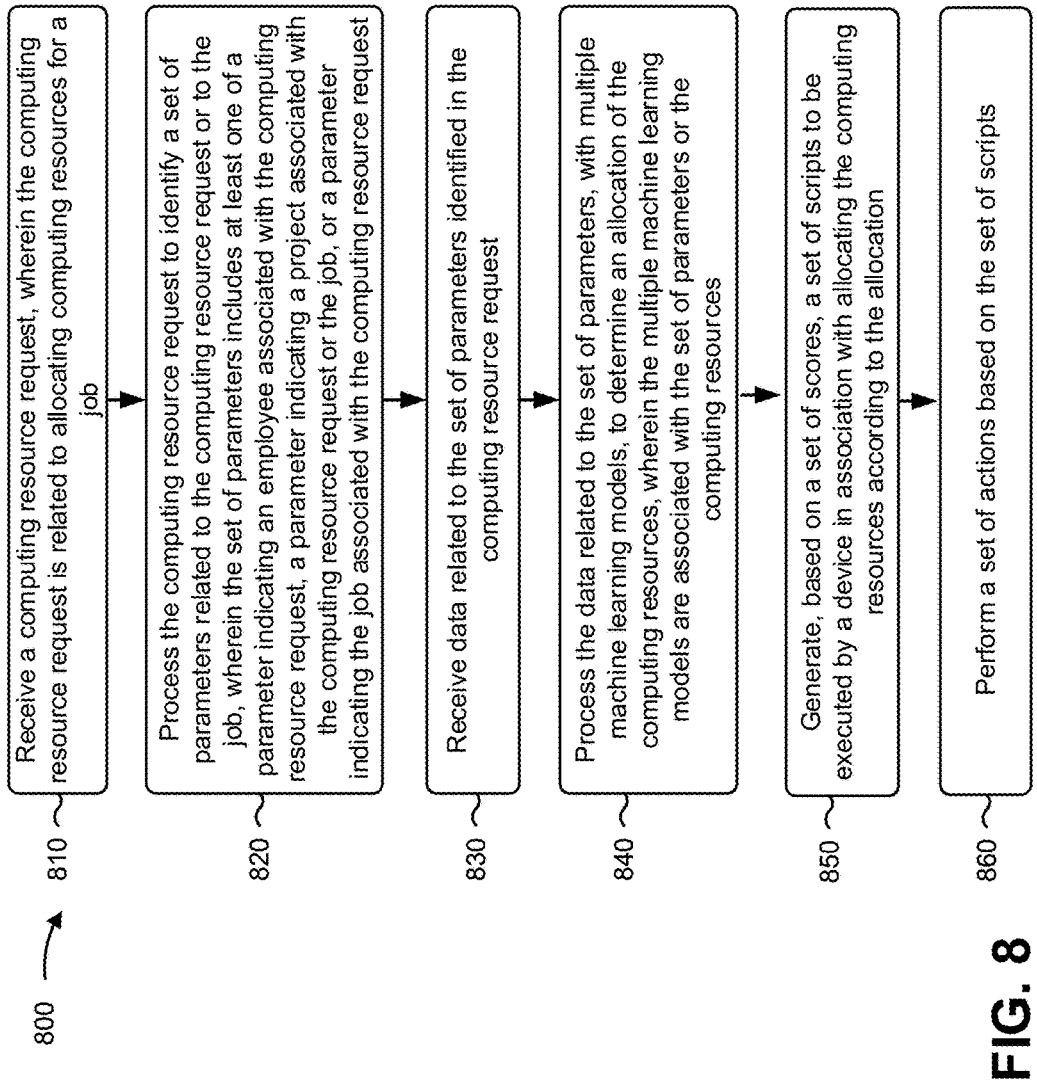

DETERMINING AN ALLOCATION OF COMPUTING RESOURCES FOR A JOB

BACKGROUND

An organization may utilize various types of computing resources to complete various types of jobs. A computing resource may include a device (e.g., a server device and/or a client device), a central processing unit (CPU), a memory, a virtual machine (VIVI), an application, and/or the like. A job may include processing data, running an application or a program, generating a report, performing a test (e.g., of a computing resource, an application, and/or the like), and/or the like.

SUMMARY

According to some possible implementations, a method may comprise receiving, by a device, a computing resource request, wherein the computing resource request is related to allocating computing resources for a job; processing, by the device, the computing resource request to identify a set of parameters related to the computing resource request, or to the job, based on receiving the computing resource request, wherein the set of parameters includes at least one of: information identifying an employee associated with the computing resource request, information identifying a project associated with the computing resource request, or information identifying the job associated with the computing resource request; obtaining, by the device, data related to the set of parameters identified in the computing resource request; processing, by the device, the data related to the set of parameters, with multiple machine learning models, to determine an allocation of the computing resources for the job, wherein the multiple machine learning models are associated with the set of parameters or the computing resources; generating, by the device and based on a set of scores, a set of scripts related to causing the computing resources to be allocated for the job according to the allocation; and performing, by the device, a set of actions based on the set of scripts.

According to some possible implementations, a device may comprise one or more memories; and one or more processors, communicatively coupled to the one or more memories, to receive a computing resource request, wherein the computing resource request is related to allocating computing resources for a job; process the computing resource request to identify a set of parameters related to the computing resource request or to the job, wherein the set of parameters is to be used to predict an allocation of the computing resources for the job based on multiple entities associated with the computing resource request; utilize a machine learning model to process data related to the set of parameters identified in the computing resource request, wherein the multiple machine learning models are associated with the set of parameters or the computing resources; predict the allocation of the computing resources for the job based on utilizing the multiple machine learning models to process the data; generate, based on a set of scores, a set of scripts related to causing the computing resources to be allocated for the job according to the allocation; and perform a set of actions based on the set of scripts.

According to some possible implementations, a non-transitory computer-readable medium storing instructions, the instructions comprising one or more instructions that, when executed by one or more processors, cause the one or more processors to receive a computing resource request, wherein the computing resource request is related to allocating computing resources for a job; process the computing resource request to identify a set of parameters related to the computing resource request or to the job, wherein the set of parameters includes at least one of: a parameter indicating an employee associated with the computing resource request, a parameter indicating a project associated with the computing resource request or the job, or a parameter indicating the job associated with the computing resource request; receive data related to the set of parameters identified in the computing resource request; process the data related to the set of parameters, with multiple machine learning models, to determine an allocation of the computing resources, wherein the multiple machine learning models are associated with the set of parameters or the computing resources; generate, based on a set of scores, a set of scripts to be executed by a device in association with allocating the computing resources according to the allocation; and perform a set of actions based on the set of scripts.

BRIEF DESCRIPTION OF THE DRAWINGS

FIG. 8 is a flow chart of an example process for determining an allocation of computing resources for a job.

DETAILED DESCRIPTION

Figure 1A:
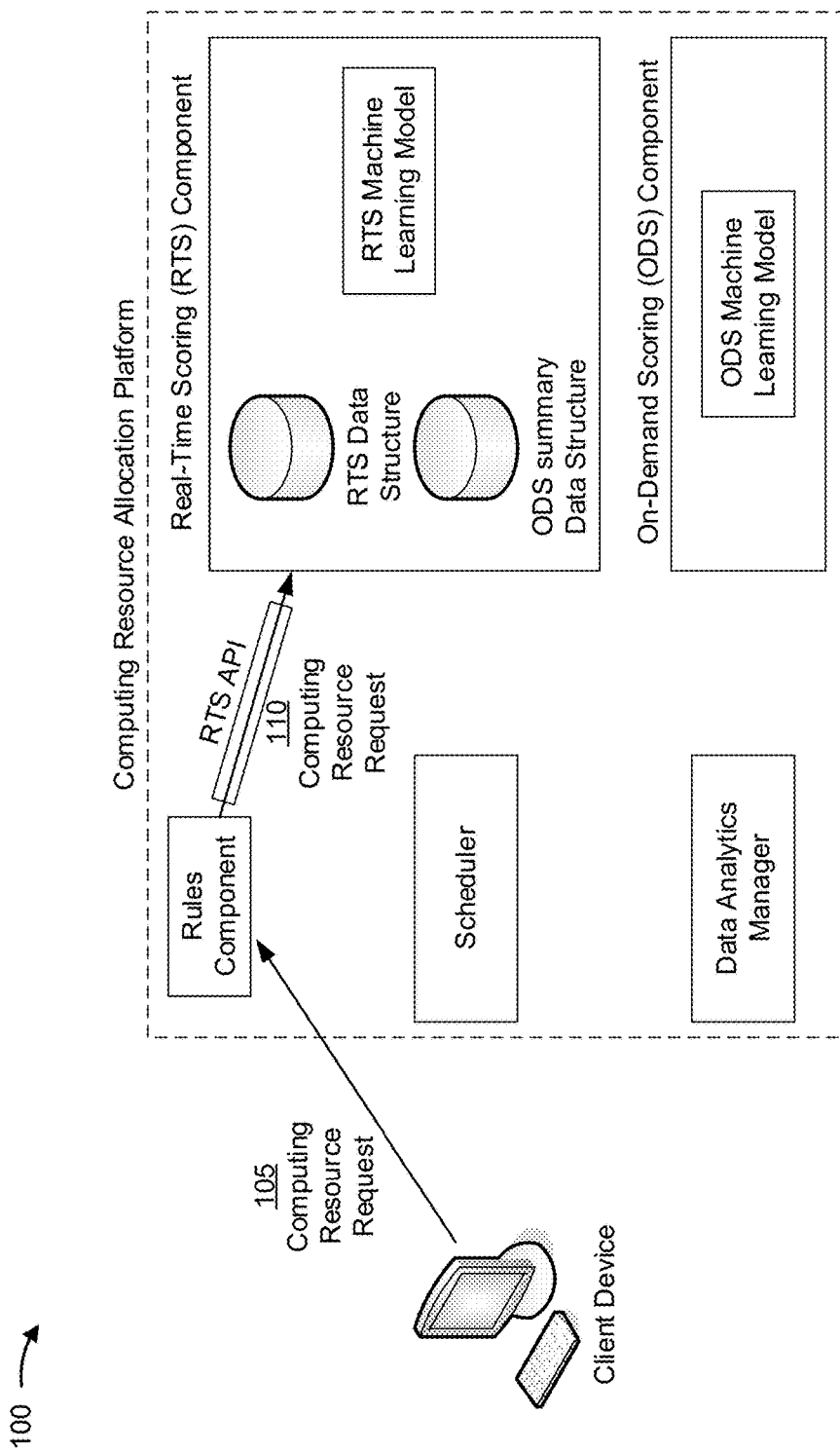
FIGS. 1A-1G are diagrams of an example implementation described herein.

The following detailed description of example implementations refers to the accompanying drawings. The same reference numbers in different drawings may identify the same or similar elements.

An organization may utilize various types of computing resources to perform various types of jobs. For example, the organization may utilize a device (e.g., a server device and/or a client device), a central processing unit (CPU), memory, a virtual machine (VM), an application, and/or the like to process data, to run an application and/or a program, to generate a report, to perform a test (e.g., of a computing resource), and/or the like. Different types and/or amounts of computing resources may be needed for different jobs (e.g., different jobs may need different combinations of computing resources, different quantities of CPUs, different amounts of memory, and/or the like), and estimating the types and/or amount of computing resources needed for a job can be difficult and/or highly inaccurate, thereby causing waste and/or inefficiency related to allocating computing resources for different jobs.

Further, depending on the size of the organization, there may be thousands, millions, or more requests for computing resources for thousands, millions, or more jobs. Processing these requests and/or allocating computing resources for jobs on this scale can create a technical challenge for the organization, as the organization may lack a tool capable of accurately handling this type of scale. For example, these requests may be processed as is, and may include significant inaccuracies that result in wasted time determining inaccurate allocations of computing resources, wasted computing resources due to under estimations and/or over estimations, and/or the like.

Some implementations described herein provide a computing resource allocation platform that is capable of processing thousands, millions, or more requests for computing resources across an organization, across geographic locations (e.g., different geographic locations associated with an organization), and/or the like and allocating the computing resources for the requests in real-time and based on historical uses of the computing resources. In addition, the computing resource allocation platform may be capable of monitoring usage of the computing resources and/or performance of jobs for which the computing resources are being used to dynamically re-allocate the computing resources during performance of the jobs to adjust for deviations from performance predictions on which the computing resources were originally allocated. In this way, the computing resource allocation platform provides a tool that can more accurately allocate computing resources for a job and that can manage usage of the computing resources across multiple jobs at scale (e.g., can manage computing resources used for thousands, millions, or more jobs).

This reduces or eliminates waste with regard to allocation of computing resources for a job (e.g., by reducing or eliminating over-allocation of computing resources for the job). In addition, this improves an efficiency of allocating computing resources for a job relative to prior techniques for allocating computing resources by reducing or eliminating delay between a request for the computing resources and allocation of the computing resources. Further, this increases a quantity of jobs for which the computing resources can be used (e.g., via more accurate and/or efficient allocation of the computing resources, intelligent scheduling and/or re-allocation of the computing resources, and/or the like), thereby improving a functioning of the computing resources.

FIGS. 1A-1G are diagrams of an example implementation 100 described herein. As shown in FIG. 1A, implementation 100 includes a client device and a computing resource allocation platform.

As shown by reference number 105, the client device may send, and the computing resource allocation platform may receive, a computing resource request. For example, the client device may send the computing resource request after receiving input from a user of the client device, after a user of the client device selects a user interface element (e.g., a button, a control, etc.) associated with a user interface provided for display via a display associated with the client device, and/or the like. Although FIG. 1A shows a single client device providing, and the computing resource allocation platform receiving, a single computing resource request, in practice, hundreds, thousands, or more client devices may provide thousands, millions, or more computing resource requests for thousands, millions, or more jobs. In this way, the computing resource allocation platform may receive computing resource requests for processing at a scale that is not possible by a human actor.

In some implementations, the computing resource request may be related to allocating computing resources for a job. For example, the computing resource request may be associated with causing computing resources (e.g., of a data center) to be allocated for the job. In some implementations, the computing resource request may include a set of parameters related to the computing resource request. For example, the set of parameters may include information that identifies various entities associated with the computing resource request, such as an individual (e.g., an employee) associated with the computing resource request (e.g., that submitted the computing resource request) or the job, a project associated with the computing resource request or the job, the job associated with the computing resource request, a project team and/or department of an organization associated with the computing resource request, a requested due date and/or time for completion of the job, a size of any files that are to be processed in association with the performing the job, an estimated amount of computing resources needed for the job (e.g., determined by the individual who submitted the computing resource request), and/or the like. In this way, when the computing resource allocation platform processes a computing resource request, the computing resource allocation platform can determine (or predict) an allocation of computing resources by profiling multiple entities simultaneously.

As further shown in FIG. 1A, the computing resource allocation platform may receive the computing resource request via a rules component associated with the computing resource allocation platform. For example, the rules component may include one or more devices and/or components that are capable of scheduling computing resources allocated for a job, monitoring a rate and/or quantity of computing resource requests that are being received by the computing resource allocation platform, and/or the like, as described elsewhere herein.

As shown by reference number 110, the rules component may provide the computing resource request to a real-time scoring (RTS) component associated with the computing resource allocation platform. For example, the RTS component may include one or more devices and/or components that are capable of processing the computing resource request in various manners, determining a manner in which to allocate the computing resources for the job, and/or the like, as described elsewhere herein. In some implementations, the rules component may provide the computing resource request to the RTS component via an RTS application programming interface (API). For example, the RTS API may facilitate transmission of information that identifies the various parameters included in the computing resource request to the RTS component. Continuing with the previous example, the rules component may provide information that identifies selections on a form associated with the computing resource request, text input into a text box associated with a form associated with the computing resource request, and/or the like.

Figure 1B:
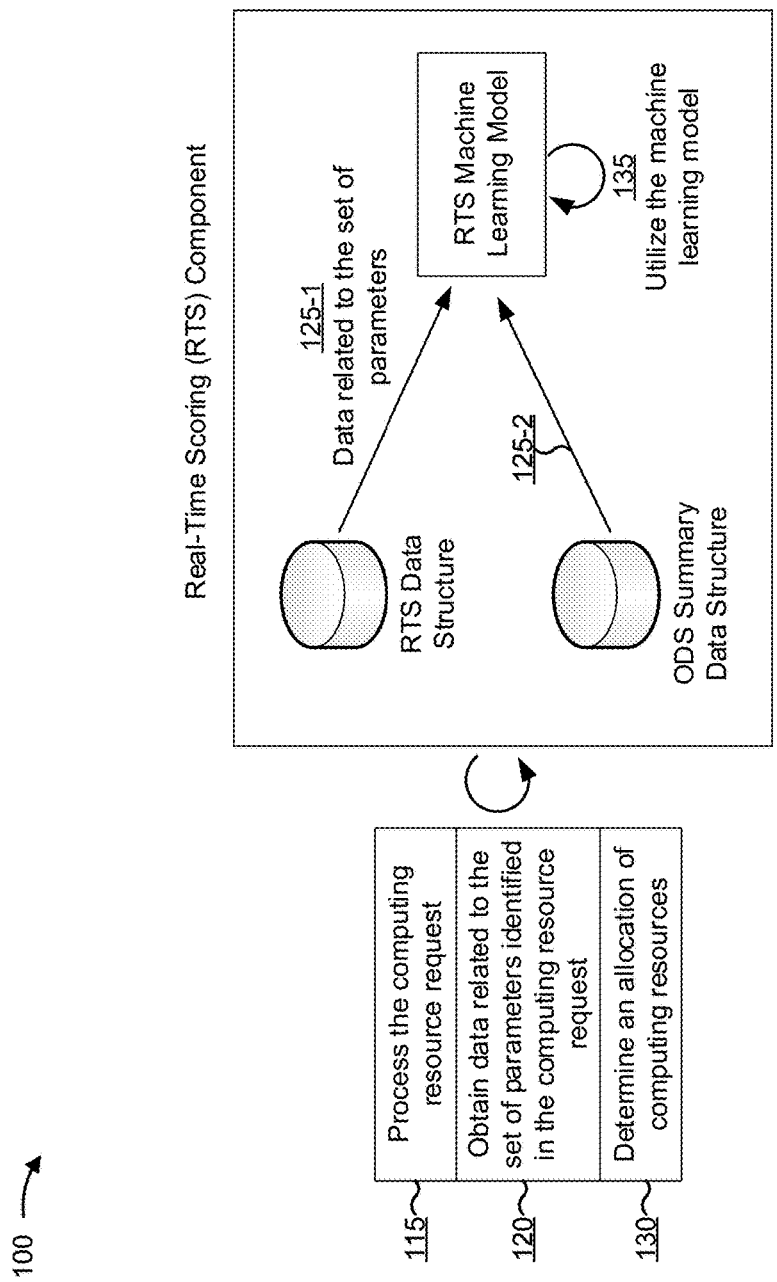

Turning to FIG. 1B, and as shown by reference number 115, the computing resource allocation platform may process the computing resource request. For example, the computing resource allocation platform may process the information received from the rules component via the RTS API. In some implementations, the computing resource allocation platform may process the computing resource request to identify the set of parameters included in the computing resource request. For example, the computing resource allocation platform may utilize the set of parameters to determine an allocation of computing resources for the job based on the set of parameters after identifying the set of parameters, as described in more detail elsewhere herein.

In some implementations, the computing resource allocation platform may process the computing resource request to identify a set of terms included in text associated with the computing resource request, a set of identifiers included in the text or associated with the computing resource request, a set of selections on a form associated with the computing resource request, and/or the like. For example, the set of terms, the set of identifiers, the set of selections, and/or the like may identify the set of parameters associated with the computing resource request.

In some implementations, the computing resource allocation platform may process the computing resource request using a machine learning model. For example, the machine learning model may have been trained on a training set of data that includes information related to a computing resource request and parameters that were identified from the information. For example, the training set of data may include information for a first computing resource request and a first set of parameters associated with the first computing resource request, information for a second computing resource request and a second set of parameters associated with the second computing resource request, and/or the like. In some implementations, the training set of data may include information for computing resource requests for various types of computing resources, for various types of jobs, for different projects, and/or the like. In some implementations, the computing resource allocation platform may utilize multiple machine learning models which may be associated with different parameters, different computing resources, and/or the like (e.g., which may have been trained on data associated with the different parameters, the different computing resources, and/or the like). In this way, the computing resource allocation platform may use machine learning models based on various cross-entity and/or multi-entity profiles, which may improve an accuracy of determining an allocation of computing resources for a computing resource request.

In some implementations, the computing resource allocation platform may portion a set of data into a training set, a validation set, a test set, and/or the like. In some implementations, the computing resource allocation platform may train the machine learning model using, for example, a factorization machine, a random forest, gradient boosting, and/or the like, and based on the training set of the data.

In some implementations, the training set of data may be organization specific (e.g., specific for the organization with which the computing resource allocation platform is associated). This provides more accurate identification of parameters that are specific to an organization. Additionally, or alternatively, the training set of data may be cross-organizational (e.g., may include data for various organizations other than the organization with which the computing resource allocation platform is associated). This provides the computing resource allocation platform with the capability to identify parameters that deviate from what is normally included in a computing resource request for an organization.

In some implementations, training of the machine learning model may include supervised training. For example, a user of the computing resource allocation platform may manually classify data to train the machine learning model. This may increase an accuracy of training of the machine learning model.

In some implementations, the computing resource allocation platform may use a factorization machine technique to train a machine learning model. For example, the factorization machine technique may train the machine learning model on features included in a data set. Additionally, or alternatively, the computing resource allocation platform may use a random forest technique to train a machine learning model. For example, the computing resource allocation platform may use the random forest technique to train the machine learning model by constructing multiple decision trees from the data. Additionally, or alternatively, the computing resource allocation platform may train the machine learning model using a gradient boosting technique. For example, the computing resource allocation platform may use the gradient boosting technique to generate a prediction model based on a data set.

In some implementations, the computing resource allocation platform may use a logistic regression classification technique to determine a categorical outcome (e.g., parameters included in the computing resource request). Additionally, or alternatively, the computing resource allocation platform may use a naïve Bayesian classifier technique. In this case, the computing resource allocation platform may perform binary recursive partitioning to split the data of the minimum feature set into partitions and/or branches, and use the partitions and/or branches to perform predictions (e.g., that data is associated with a parameter). Based on using recursive partitioning, the computing resource allocation platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the computing resource allocation platform may use a support vector machine (SVM) classifier technique to generate a non-linear boundary between data points in the training set. In this case, the non-linear boundary is used to classify test data (e.g., data relating to computing resource requests) into a particular class (e.g., a class indicating a parameter).

In some implementations, rather than training a model, the computing resource allocation platform may receive a model from another device (e.g., a server device). For example, a server device may generate a model based on having trained the model in a manner similar to that described above and may provide the model to the computing resource allocation platform (e.g., may pre-load the computing resource allocation platform with the model, may receive a request from the computing resource allocation platform for the model, and/or the like). In some implementations, the computing resource allocation platform may perform a lookup to identify a model for processing a computing resource request. For example, the computing resource allocation platform may perform a lookup of a model associated with a type of job, a project, an individual, and/or the like associated with the computing resource request. In other words, the computing resource allocation platform may utilize various models to identify a set of parameters included in the computing resource request, thereby increasing an accuracy of identifying the set of parameters.

In some implementations, output from the model may identify the set of parameters and/or values for the set of parameters. For example, the output may identify an individual associated with the computing resource request, a project associated with the computing resource request, a requested due date for the computing resource request, and/or the like.

In some implementations, the computing resource allocation platform may process the computing resource using a text processing technique to identify the set of parameters. For example, the computing resource allocation platform may utilize a computational linguistics technique, a text analysis technique, a natural language processing (NLP)

technique, and/or the like to process the computing resource request to identify the set of parameters. In some implementations, the computing resource allocation platform may utilize the text processing technique to identify terms and/or phrases included in the computing resource request that identify the set of parameters included in the computing resource request and/or values for the computing resource request (e.g., after correcting typos in the text, removing stop words in the text, identifying nouns and/or verbs in the text, and/or the like).

In this way, the computing resource allocation platform may process the computing resource request in a manner different from that of a human actor and/or at a scale not possible by a human actor (e.g., via utilization of various trained models and/or data processing techniques).

As shown by reference number 120, the computing resource allocation platform may obtain data related to the set of parameters identified in the computing resource request. For example, the computing resource allocation platform may obtain data to be used to predict an allocation of computing resources for the job associated with the computing resource request, as described in more detail elsewhere herein.

In some implementations, the data related to the set of parameters may include historical data related to one or more other jobs. For example, the historical data may identify an amount of computing resources allocated for a job, whether the amount of computing resources allocated for the job was sufficient for completion of the job, whether any computing resources allocated for the job were unused during completion of the job, a run-time for the job, and/or the like. Additionally, or alternatively, the data related to the set of parameters may include performance data related to a performance of the job and/or one or more other jobs. For example, the performance data may include real-time or near real-time data of a performance of the job (when the job is being performed using the computing resources) and/or a performance of one or more other jobs. Continuing with the previous example, the performance data may identify an amount of time that computing resources have been completing a job, an estimated amount of time remaining to complete a job, a percentage of the job that has been completed and/or that is to be completed, a load of the computing resources (e.g., a percentage of a maximum computing capacity of the computing resources that is being used for the job, a quantity of jobs that a computing resource is completing, and/or the like), a speed at which the computing resources are operating (e.g., how many megabytes (MB) of data are being processed in a time period, how many gigabytes (GB) of data are being processed in a time period, and/or the like), an extent to which a predicted amount of computing resources needed for a job matches an actual amount of computing resources needed for the job, a quantity of jobs that have been queued for a computing resource, and/or the like.

In some implementations, the computing resource allocation platform may obtain the data related to the set of parameters by providing, to a data source, a query for the data related to the set of parameters. For example, the computing resource allocation platform may provide, to a data source, a query that identifies the set of parameters identified in the computing resource request to obtain data related to the set of parameters. In some implementations, the computing resource allocation platform may select a template query to use based on the set of parameters identified in the computing resource request, a data source from which the data related to the set of parameters is to be obtained, and/or the like. In some implementations, the computing resource allocation platform may include, in the template query, information identifying the set of parameters for which the data is to be obtained. In this way, the computing resource allocation platform may generate a query to be used to obtain data related to the set of parameters.

As shown by reference numbers 125-1 and 125-2, the computing resource allocation platform may receive the data related to the set of parameters from multiple data sources. For example, the multiple data sources may include an RTS data structure and an on-demand scoring (ODS) summary data structure. Continuing with the previous example, the RTS data structure may store historical data related to the job to be performed by the computing resources, such as data that identifies whether a determined allocation of computing resources was sufficient for a job, adjustments to the allocation of computing resources for a job during performance of the job, and/or the like. Continuing still with the previous example, the ODS summary data structure may store performance data related to a performance of a job (when the computing resources are performing the job) and/or related to one or more other jobs that the computing resources are performing, time-series summaries of performance data for the job and/or one or more other jobs, and/or the like, such as an amount of allocated computing resources that are and/or were used at a particular time for a job, an amount of a job that has been completed at a particular time, and/or the like.

In some implementations, the computing resource allocation platform may provide the data related to the set of parameters to an RTS machine learning model associated with the computing resource allocation platform. For example, the RTS machine learning model may be the same as or similar to other models described elsewhere herein and may be trained to predict types and/or amounts of computing resources needed for a job (e.g., an allocation of computing resources), in a manner similar to that described elsewhere herein.

As shown by reference number 130, the computing resource allocation platform may determine an allocation of computing resources for the job (e.g., based on the data related to the set of parameters). For example, the computing resource allocation platform may determine a type of computing resources to be allocated for the job, an amount of computing resources to be allocated for the job, and/or the like. In some implementations, the computing resource allocation platform may determine a baseline allocation of computing resources for the job, adjustments that are predicted to be needed during completion of the job, and/or the like. In some implementations, the computing resource allocation platform may determine an identity of particular computing resources to be allocated to the job (e.g., computing resources that are of a particular version, that are located within a particular data center, and/or the like).

As shown by reference number 135, the computing resource allocation platform may utilize an RTS machine learning model to determine the allocation. For example, the computing resource allocation platform may utilize the RTS machine learning model to process data related to the set of parameters to determine the allocation of the computing resources for the job. In some implementations, the computing resource allocation platform may utilize the RTS machine learning model to perform a prediction for the allocation of the computing resources (e.g., based on historical data related to the set of parameters, performance data related to the job or one or more other jobs, and/or the like) based on having been trained in a manner similar to that described elsewhere herein (e.g., on a training set of data that includes data identifying an actual computing resource utilization for other jobs and information that identifies a set of parameters associated with the other jobs).

In some implementations, output from the RTS machine learning model may be based on the data related to the set of parameters. For example, when processing historical data related to the set of parameters, the RTS machine learning model may output information that identifies types and/or amounts of computing resources for a job based on types and/or amounts of computing resources used for other jobs associated with the same individual that submitted the computing resource request, associated with the same project as the job, associated with the same types of actions as the job, and/or the like.

Additionally, or alternatively, and as another example for performance data from the ODS summary data structure, the machine learning model may determine a schedule of adding and/or removing computing resources (e.g., amounts and/or types of computing resources) during performance of the job. For example, the RTS machine learning model, using summaries of the performance data over time related to one or more other jobs in combination with data from the RTS data structure, may determine that a baseline amount of computing resources may be needed to complete the job, but that different types and/or amounts of computing resources may be needed at different points during completion of the job. Continuing with the previous example, the computing resource allocation platform may determine that at different times the amount of computing resources may need to be increased or decreased, that particular types of computing resources may need to be added or removed from the computing resources being used to complete the job, and/or the like. This conserves computing resources related to performing the job by facilitating accurate and/or dynamic scheduling of computing resources for the job, by facilitating release of computing resources for use with another job when not needed for the job, and/or the like, thereby improving scheduling and/or allocation of the computing resources.

Additionally, or alternatively, and as another example for performance data from the ODS summary data structure, the RTS machine learning model may process summaries of performance data for the job over time to adjust computing resources allocated to the job. Continuing with the previous example, the computing resource allocation platform may utilize the RTS machine learning model to determine a manner in which to adjust computing resources allocated to the job based on an extent to which a prediction of the computing resources needed for the job matches an actual consumption of the computing resources during performance of the job. Similarly, and continuing with the previous example, the computing resource allocation platform may determine a manner in which to adjust the computing resources allocated to the job based on completion of other jobs (e.g., may re-allocate computing resources from another job to the job after the other job has been completed), based on a quantity of jobs in a queue for computing resources (e.g., may re-allocate some computing resources from the job to another job in a queue for computing resources), based on a priority of the job relative to another job (e.g., a higher priority job may be allocated more and/or different types of computing resources relative to a lower priority job), and/or the like.

In some implementations, a rules component (e.g., used by the computing resource allocation platform) may determine a priority of the computing resource request in association with determining the allocation of the computing resources. For example, the rules component may determine that the computing resource request has a high priority, a medium priority, or a low priority, a higher priority or a lower priority relative to another computing resource request, and/or the like. In some implementations, the RTS machine learning model may determine the priority based on the set of parameters identified in the computing resource request. For example, different parameters and/or different values for a parameter may be associated with a higher or a lower priority relative to other parameters and/or values for a parameter. Continuing with the previous example, an individual who submits a computing resource request may have a higher or lower priority relative to another individual based on the individual's job title, a project associated with a computing resource request may have a higher or lower priority relative to another project associated with another computing resource request, and/or the like.

In some implementations, a rules component (e.g., used by the computing resource allocation platform) may determine the allocation of computing resources based on the priority associated with the computing resource request. For example, a higher priority computing resource request may be allocated computing resources first before a lower priority computing resource request, may not have to share computing resources with a lower priority computing resource request, may be queued ahead of a lower priority computing resource request, may be allocated additional computing resources to increase a likelihood that the performance of the job is not interrupted due to insufficient computing resources, and/or the like.

In some implementations, the RTS machine learning model may determine a score related to the allocation of the computing resources. For example, the RTS machine learning model may determine a score based on the data related to the set of parameters that the RTS machine learning model used to determine the allocation. In some implementations, the score may indicate a likelihood that the computing resources allocated for the job will be sufficient to complete the job (e.g., by a requested deadline), a likelihood that the computing resources allocated to the job will need to be adjusted during completion of the job, a likely run-time for a job related to the computing resource request, and/or the like (e.g., based on prior results of allocations of computing resources). In this way, the computing resource allocation platform may allocate computing resources to satisfy a requested abend rate and/or run-time.

In some implementations, the RTS component may process data related to the set of parameters in real-time or near real-time (e.g., as a computing resource request is received by the computing resource allocation platform, within a threshold amount of time of receiving the computing resource request, and/or the like). In some implementations, the RTS component may batch process data. For example, the RTS component may batch process logs related to use of computing resources to complete a job (e.g., logs that identify an amount of computing resources requested for a job compared to an amount of computing resources actually used for the job) to update the RTS machine learning model to more accurately allocate computing resources for future jobs, and/or the like. In some implementations, the batch processing may be integrated with the real-time (or near real-time) processing such that the RTS machine learning model can be updated without interruption to the real-time (or near real-time) processing of data. For example, while the RTS component is using the RTS machine learning model to perform real-time (or near real-time) computing resource predictions, the RTS component may generate an updated RTS machine learning model based on a result of the batch processing to be utilized for future processing. In this way, the RTS component may update the RTS machine learning model in a self-learning and automated manner, while maintaining a throughput of processing computing resource requests.

Figure 1C:
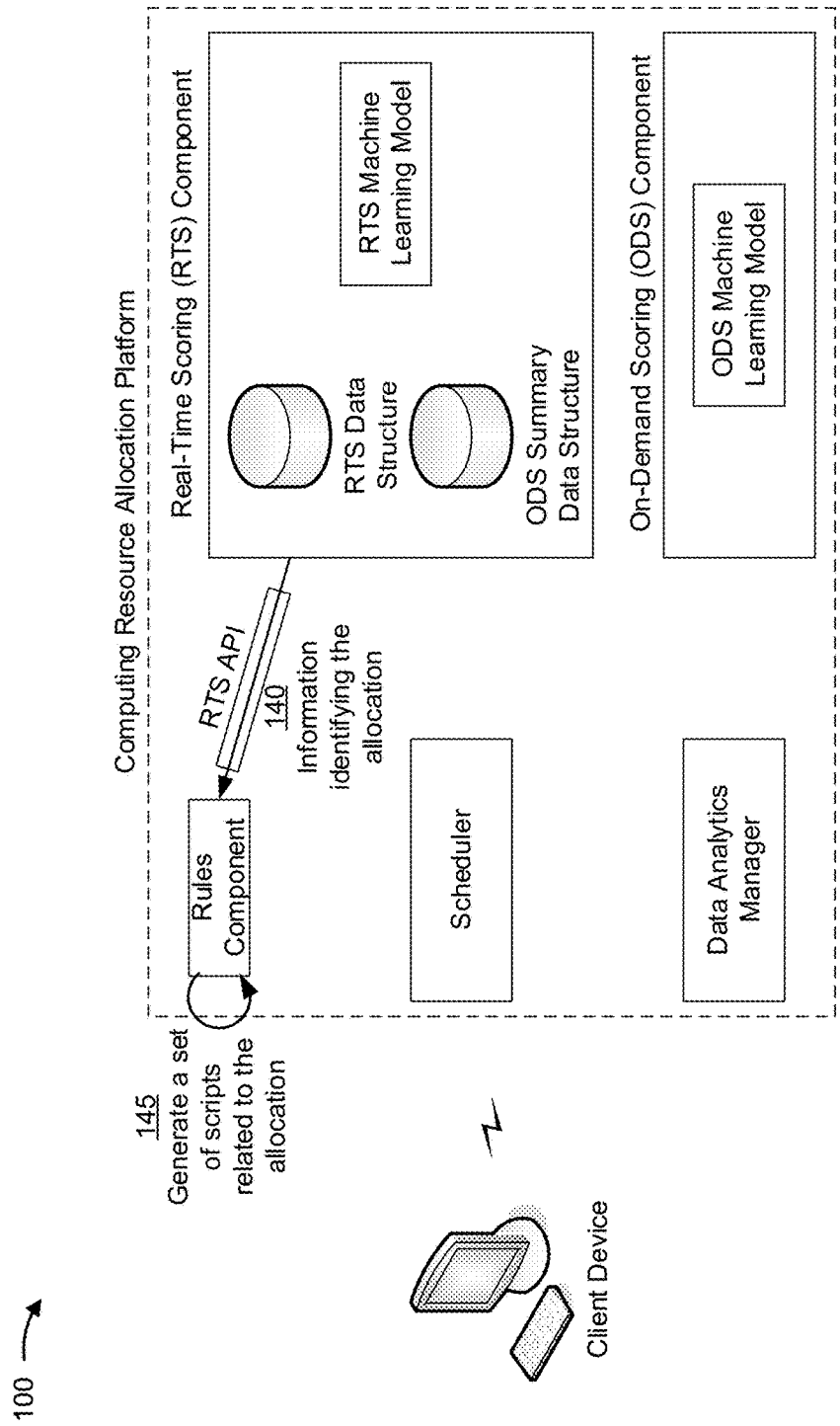

Turning to FIG. 1C, and as shown by reference number 140, the computing resource allocation platform may provide information identifying the allocation of the computing resources to the rules component. For example, the computing resource allocation platform may provide the information identifying the allocation from the RTS component after utilizing the RTS machine learning model to determine the allocation. In some implementations, the computing resource allocation platform may provide the information identifying the allocation via the RTS API between the RTS component and the rules component.

As shown by reference number 145, the computing resource allocation platform, utilizing the rules component, may generate a set of scripts related to the allocation of the computing resources. For example, the computing resource allocation platform may generate a set of scripts that the computing resource allocation platform is to use to cause the computing resources to be allocated (e.g., the set of scripts may cause the computing resource allocation platform to allocate the computing resources, may cause a device associated with a data center to allocate the computing resources, and/or the like).

In some implementations, a rules component may select, from a data structure, a set of instructions associated with computing resources to be used for the job when generating the set of scripts (e.g., a set of instructions associated with controlling operation of the computing resources). For example, the rules component may select different sets of instructions for different types of computing resources to be used. Continuing with the previous example, the computing resource allocation platform may select a first set of instructions when a set of CPUs are to be used to complete the job, may select a second set of instructions when memory resources are to be used to complete the job, may select a third set of instructions when a set of VMs are to be used to complete the job, and/or the like.

In some implementations, after selecting the set of instructions, the computing resource allocation platform may insert, into the set of instructions, information related to the computing resource request that the computing resources would need to be capable of completing the job. For example, the computing resource allocation platform may insert information identifying the allocation of the computing resources, specific computing resources within a data center to be allocated for the job, files to be processed in association with completing the job, a destination for output of results of performing the job, a requested start day and/or time for completing the job, a requested completion day and/or time, and/or the like. In some implementations, a rules component may combine sets of instructions to generate the set of scripts. For example, the rules component may combine the sets of instructions in an order in which the sets of instructions are to be executed, may append the set of instructions with additional instructions, such as instructions related to performance and/or timing of tasks related to the job, performance data to be provided by the computing resources during completion of the job, and/or the like.

Similarly, in some implementations, the rules component may select a set of instructions from a set of template instructions based on the allocation of the computing resources (e.g., based on the types and/or amounts of computing resources to be used for the job). In some implementations, the rules component may modify the set of instructions based on the allocation of the computing resources. For example, the rules component may modify the set of template instructions such that the set of template instructions cause a device to allocate a particular amount and/or type of computing resource for the job, to perform particular tasks associated with the job, and/or the like to generate the set of scripts. In this way, the rules component may consistently, efficiently, and sufficiently generate a set of scripts (e.g., based on scores generated by the RTS component, to allocate a different amount of computing resources than recommended by the RTS component, and/or the like), thereby efficiently using computing resources of the computing resource allocation platform.

In some implementations, the rules component may generate a script. For example, the rules component may include manually generated scripts for different computing resource requests, and may use these manually generated scripts to generate similar scripts for similar computing resource requests (e.g., computing resource requests for similar types of job, for similar projects, for similar completion times, and/or the like).

Figure 1D:
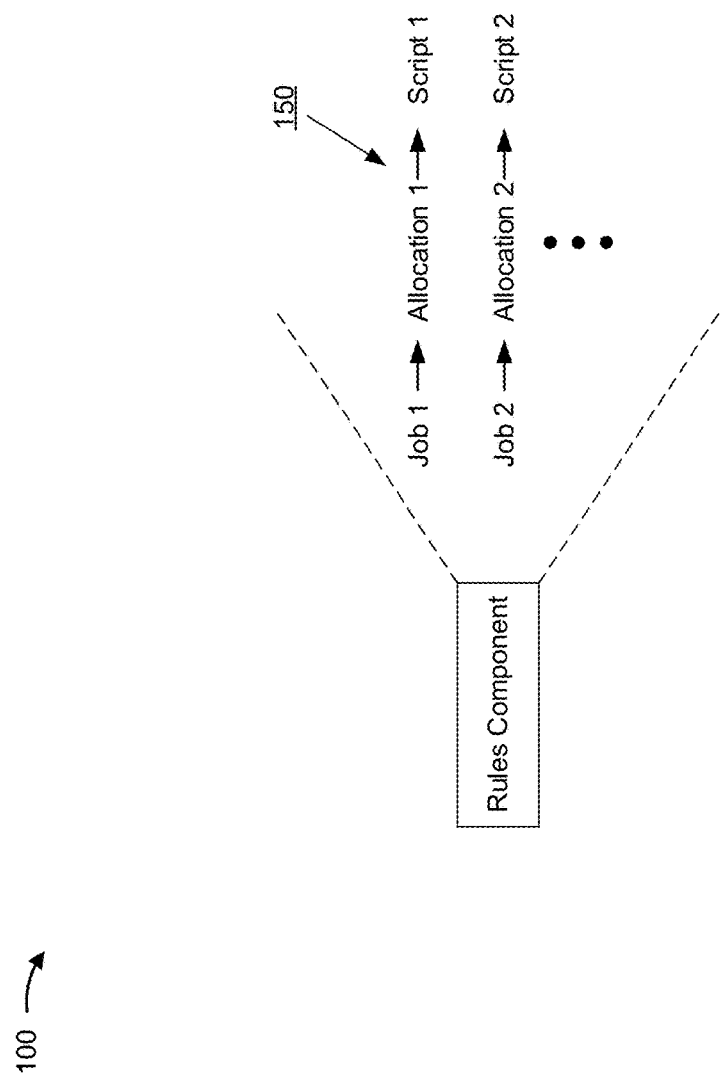

Turning to FIG. 1D, and as shown by reference number 150, the rules component, as utilized by the computing resource allocation platform, may determine different scripts for different jobs. For example, the rules component may determine different scripts for the different jobs based on the different jobs being associated with different allocations of computing resources, different sets of parameters and/or values for the sets of parameters, and/or the like.

In some implementations, the rules component may schedule the computing resources for the job in association with generating the set of scripts. For example, the rules component may schedule the computing resources for an earliest available time, based on a relative priority of the job and one or more other jobs, and/or the like. Continuing with the previous example, the rules component may store information that identifies a schedule of the computing resources for various jobs, that identifies various jobs that are currently being performed by the computing resources, that identifies an amount of the various jobs remaining for completion of the various jobs, an amount of time remaining for completion of the various jobs, and/or the like and may use this information to schedule the computing resources for the job. Continuing with the previous example, the rules component may schedule the computing resources such that computing resources for different jobs have a similar computing load, such that a computing load for computing resources used for higher relative priority jobs does not satisfy a threshold, such that there is a threshold amount of back-up computing resources available for the job, and/or the like.

Figure 1E:
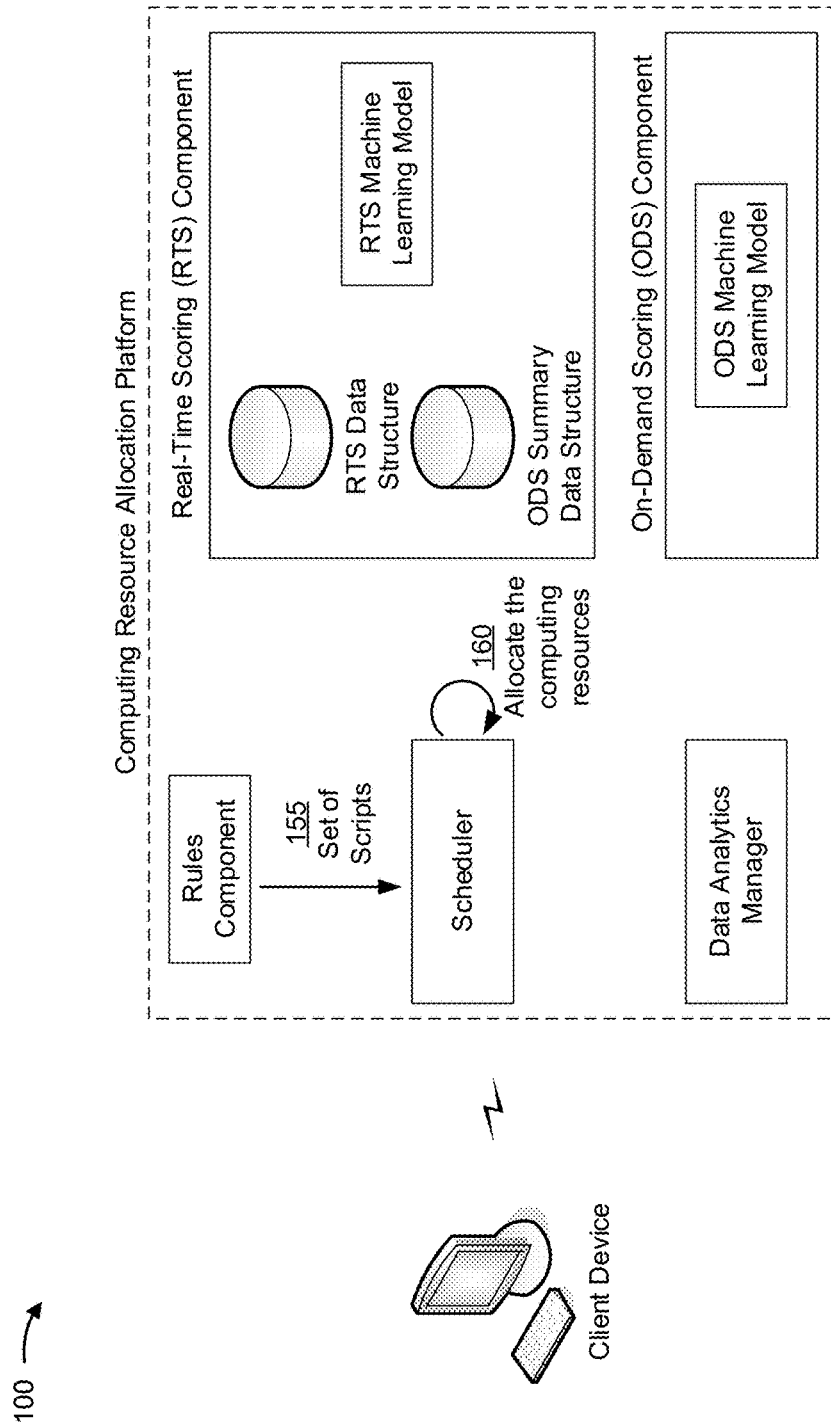

Turning to FIG. 1E, and as shown by reference number 155, the rules component may provide the set of scripts to a scheduler associated with the computing resource allocation platform. For example, the computing resource allocation platform may provide the set of scripts from the rules component to the scheduler. In some implementations, the scheduler may include one or more devices and/or components that are capable of executing the set of scripts to cause the computing resources to be allocated for the job.

As shown by reference number 160, the computing resource allocation platform, utilizing the scheduler, may allocate the computing resources for the job. For example, the scheduler may execute the set of scripts received from the rules component and may allocate the computing resources based on executing the set of scripts. In some implementations, the computing resource allocation platform may allocate local computing resources for the job (e.g., computing resources local to the computing resource allocation platform). Additionally, or alternatively, the scheduler may allocate cloud resources, resources of a data center remote to the computing resource allocation platform, a combination of local computing resources and remote computing resources, and/or the like for completion of the job.

In some implementations, the computing resource allocation platform may determine whether to allocate local computing resources and/or remote computing resources for performance of the job. For example, the computing resource allocation platform may determine whether to allocate the local or the remote computing resources based on an amount of computing resources predicted to be used for the job (e.g., cloud computing resources may be allocated when the amount satisfies a threshold), a version of the computing resources (e.g., computing resources with the most recent version of software may be allocated for the job), a completion time for the job (e.g., allocation of local computing resources may cause a job to be completed more slowly and/or may impact other operations of the computing resource allocation platform), and/or the like.

Figure 1F:
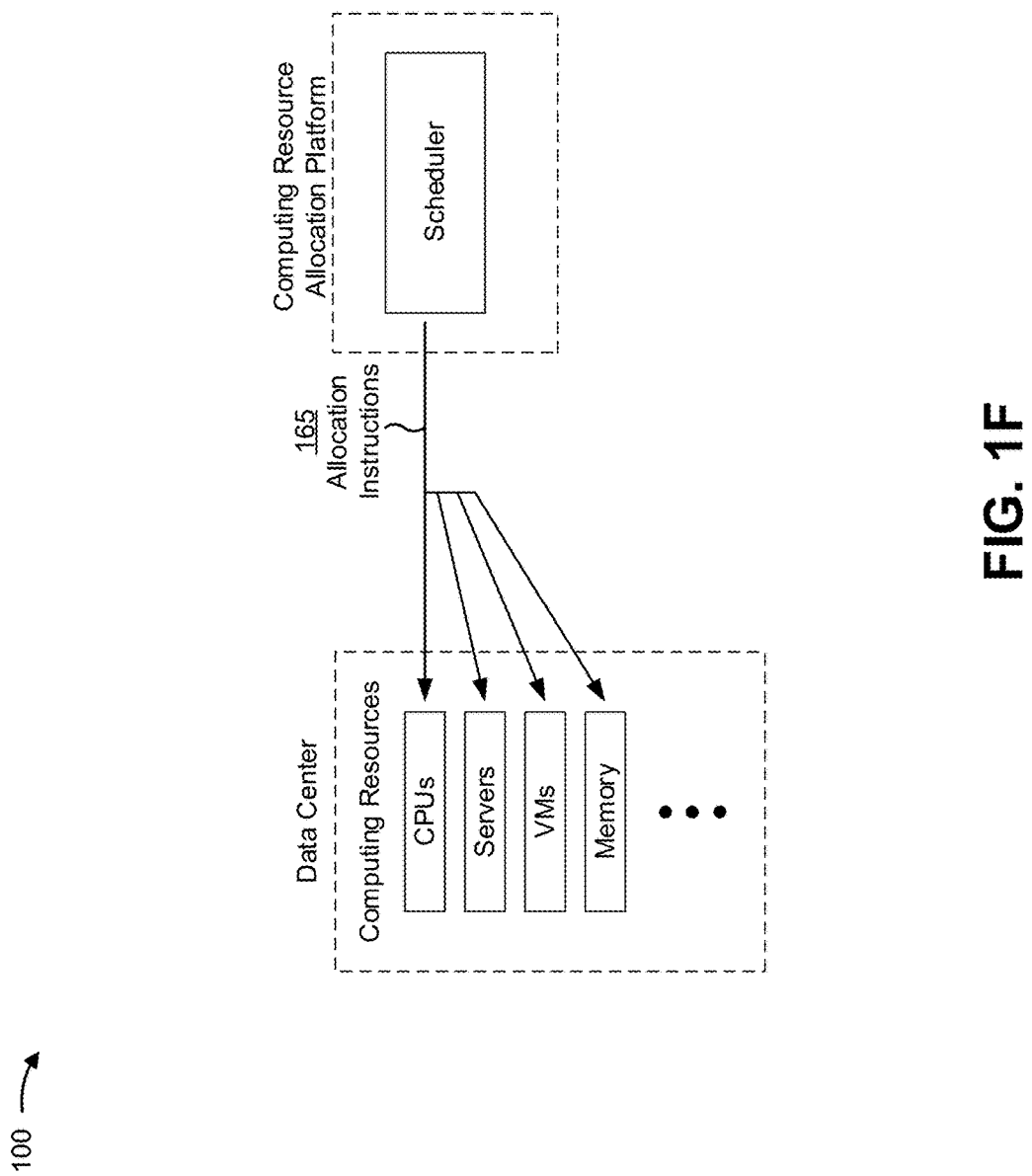

Turning to FIG. 1F, and as shown by reference number 165, the scheduler may allocate the computing resources by providing allocation instructions to computing resources associated with a data center. For example, the allocation instructions may cause the computing resources to be allocated for the job, to perform an action related to completing the job, and/or the like.

In some implementations, the computing resource allocation platform may perform an action after allocating the computing resources for the job. For example, the computing resource allocation platform may provide, for display via a display associated with the client device, information that identifies the allocation of the computing resources, a completion status of the job (e.g., whether the job is being performed by the computing resources, an amount of the job that remains to be completed, an amount of time remaining to complete the job, and/or the like). Additionally, or alternatively, and as another example, the computing resource allocation platform may send a message to the client device with similar information previously described.

Figure 1G:
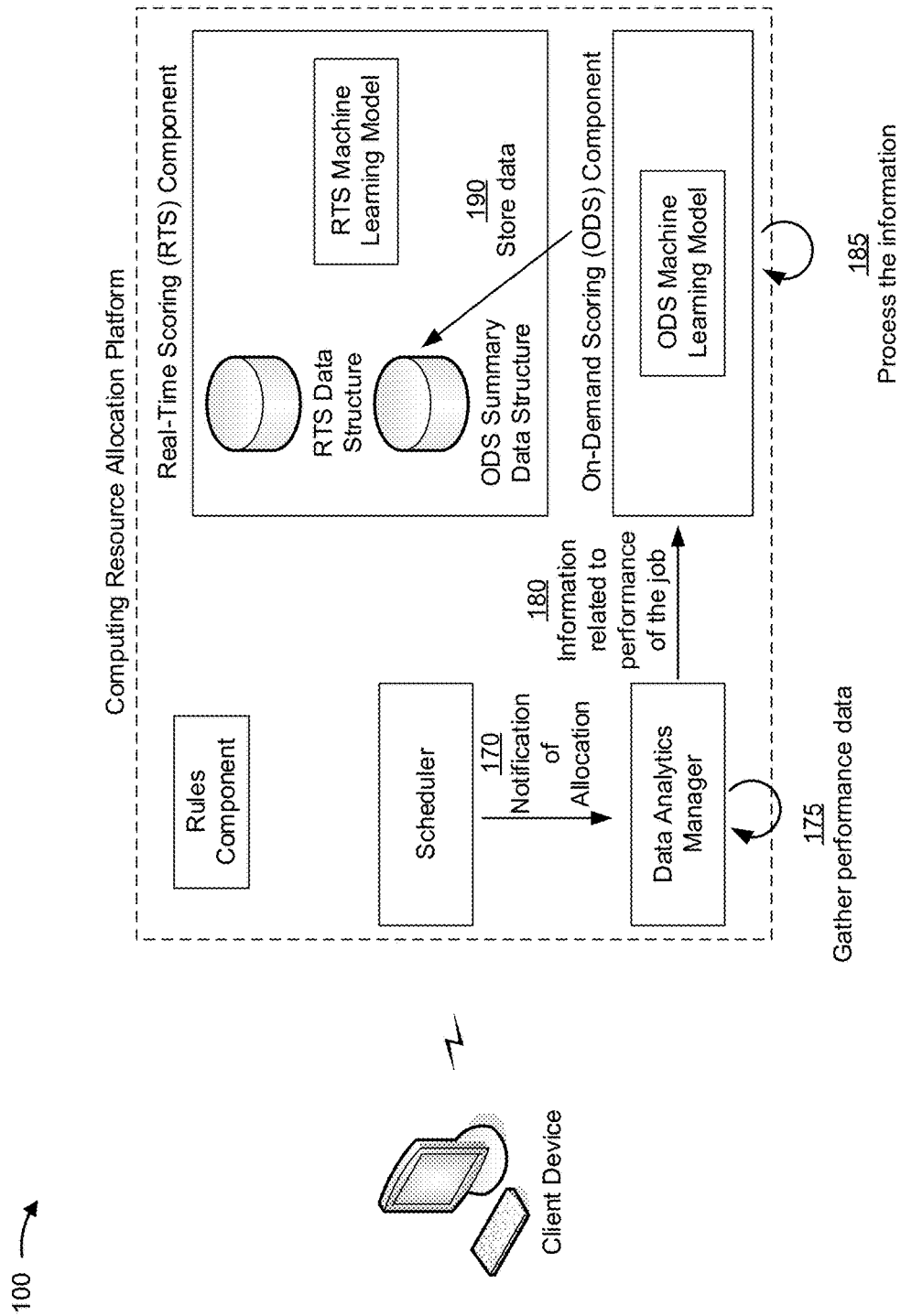

Turning to FIG. 1G, and as shown by reference number 170, the computing resource allocation platform may cause the scheduler to provide, to a data analytics manager, a notification of allocation of the computing resources. For example, the computing resource allocation platform may provide the notification from the scheduler to the data analytics manager. In some implementations, the scheduler may provide this information periodically, according to a schedule, based on receiving a request to provide the information, and/or the like.

In some implementations, the data analytics manager may include one or more devices and/or components capable of gathering performance data related to performance of a job by the computing resources, capable of performing analytics on the performance data, and/or the like.

As shown by reference number 175, the computing resource allocation platform, utilizing the data analytics manager, may gather performance data related to computing resource usage and/or performance of the job. For example, the data analytics manager may receive the performance data from the computing resources in real-time or near real-time, according to a schedule, periodically, based on requesting the performance data, and/or the like.

In some implementations, the data analytics manager may perform analytics on the performance data (e.g., after providing information related to performance of the job, described below). For example, the data analytics manager may determine whether a load of the computing resources satisfies a threshold during performance of the job, may determine whether an amount time for an amount of the job that is complete matches other jobs and/or a prediction determined by the computing resource allocation platform, whether a performance of the computing resources matches a performance of other computing resources of the same type that are performing other jobs, and/or the like. In some implementations, the data analytics manager may generate a report related to performing the analytics (e.g., that includes information identifying a result of performing the analytics). Additionally, or alternatively, the scheduler may generate a summary of a performance of the job based on the performance data and/or a result of performing the analytics. For example, the scheduler may generate a summary that identifies an amount of time that the computing resources have been performing the job, an amount of time remaining to perform the job, an amount of the job that has been completed or is remaining to be completed, and/or the like. In some implementations, the computing resource allocation platform may output a generated report and/or summary for display via a display associated with the computing resource allocation platform.

As shown by reference number 180, the computing resource allocation platform may cause the data analytics manager to provide information related to performance of the job, such as the performance data, a report, a result of performing analytics, a log of when the computing resource request was generated and/or an individual that generated the computing resource request, and/or the like, to the ODS component. In some implementations, the data analytics platform may provide the information to the ODS component in real-time or near real-time (e.g., as the information is generated and/or gathered), according to a schedule, periodically, based on receiving a request for the information from the ODS component, and/or the like.

In some implementations, the ODS component may include one or more devices and/or components capable of processing information related to a performance of a job. For example, the ODS component may process the information to generate reports related to the information, to detect an issue related to performance of the job, to determine a re-allocation of computing resources based on a performance of the job, and/or the like. In some implementations, and as described elsewhere herein, the ODS component may process the information from the data analytics manager using an ODS machine learning model.

As shown by reference number 185, computing resource allocation platform, utilizing the ODS component, may process the information from the data analytics manager. For example, the ODS component may process performance data to generate a summary of performance data for a time period. Additionally, or alternatively, the ODS component may utilize the ODS machine learning model to process performance data to identify an issue related to performance of the job. For example, the ODS component may utilize the machine learning model to identify a pattern and/or a trend in the performance data that indicates that the computing resources are experiencing an error related to performance of the job, such as an inefficient performance of the job, performance of the job at less than an expected speed, and/or the like. Continuing with the previous example, the ODS machine learning model may be similar to other models described elsewhere herein and may have been trained to identify trends and/or patterns in performance data related to issues being experienced by the computing resources, in a manner similar to other training described elsewhere herein.

Additionally, or alternatively, the ODS component may utilize the ODS machine learning model to process performance data to determine that the computing resources need to be re-allocated (e.g., based on a trend and/or pattern associated with the performance data, based on performance data related to other computing resources, and/or the like). As a specific example, the ODS component may utilize the ODS machine learning model to determine that computing resources can be re-allocated due to other jobs being completed to reduce a load of computing resources being used to complete various different jobs. In some implementations, the ODS component may cause computing resources to be re-allocated in a manner similar to that described elsewhere herein based on determining that the computing resources need to be re-allocated.

In some implementations, the ODS component may generate a report, such as a system monitoring report. For example, the report may include information related to a performance of one or more of the machine learning models described herein, possible anomalies related to operations of the computing resource allocation platform and/or use of various computing resources, analytics related to performance data, and/or the like. As specific examples, the report may include information related to a quantity of lines read into a daily transaction log, a quantity of mis-formatted lines in log data, a quantity of unique users of the computing resource allocation platform, a quantity of jobs read into a job finish record, an average response time of the RTS component, memory minutes requested and/or wasted, a quantity of CPU minutes requested and/or wasted, average run-time, and/or the like. In some implementations, the ODS component may output the report for display via a display associated with the computing resource allocation platform and/or the client device. For example, the ODS component may output the report via a user interface (e.g., a dashboard) associated with the computing resource allocation platform and/or the client device. Additionally, or alternatively, the computing resource allocation platform may generate a text file that includes the information included in the report and may store in text file in memory resources associated with the computing resource allocation platform.

As shown by reference number 190, the computing resource allocation platform may cause the ODS component to store data in the ODS summary data structure. For example, the ODS component may store data related to processing by the ODS component in the ODS summary data structure (e.g., a summary and/or a report generated by the ODS component, an issue identified by the ODS component, a re-allocation determined by the ODS component, and/or the like). In some implementations, the data that the ODS component stores may be used by the RTS component for future determinations of allocations of computing resources. For example, the RTS component may use the data to update the RTS machine learning model to more accurately determine an allocation of computing resources for a job. This conserves computing resources that would otherwise be consumed due to an incorrectly determined allocation.

In this way, the computing resource allocation platform may determine an allocation and/or a re-allocation of computing resources for a job at a scale and/or in a manner not possible by a human actor. This provides a tool that an organization can use to more accurately and/or more efficiently allocate computing resources for a job. This reduces or eliminates wasted computing resources from a less accurate and/or a less efficient technique. In addition, this conserves time and/or other resources that would otherwise be wasted through use of a subjective technique for estimating computing resources needed for a job. Further, this provides a way to assess computing resource needs across an organization, in a manner not previously possible.

As indicated above, FIGS. 1A-1G are provided merely as an example. Other examples are possible and may differ from what was described with regard to FIGS. 1A-1G.

Figure 2:
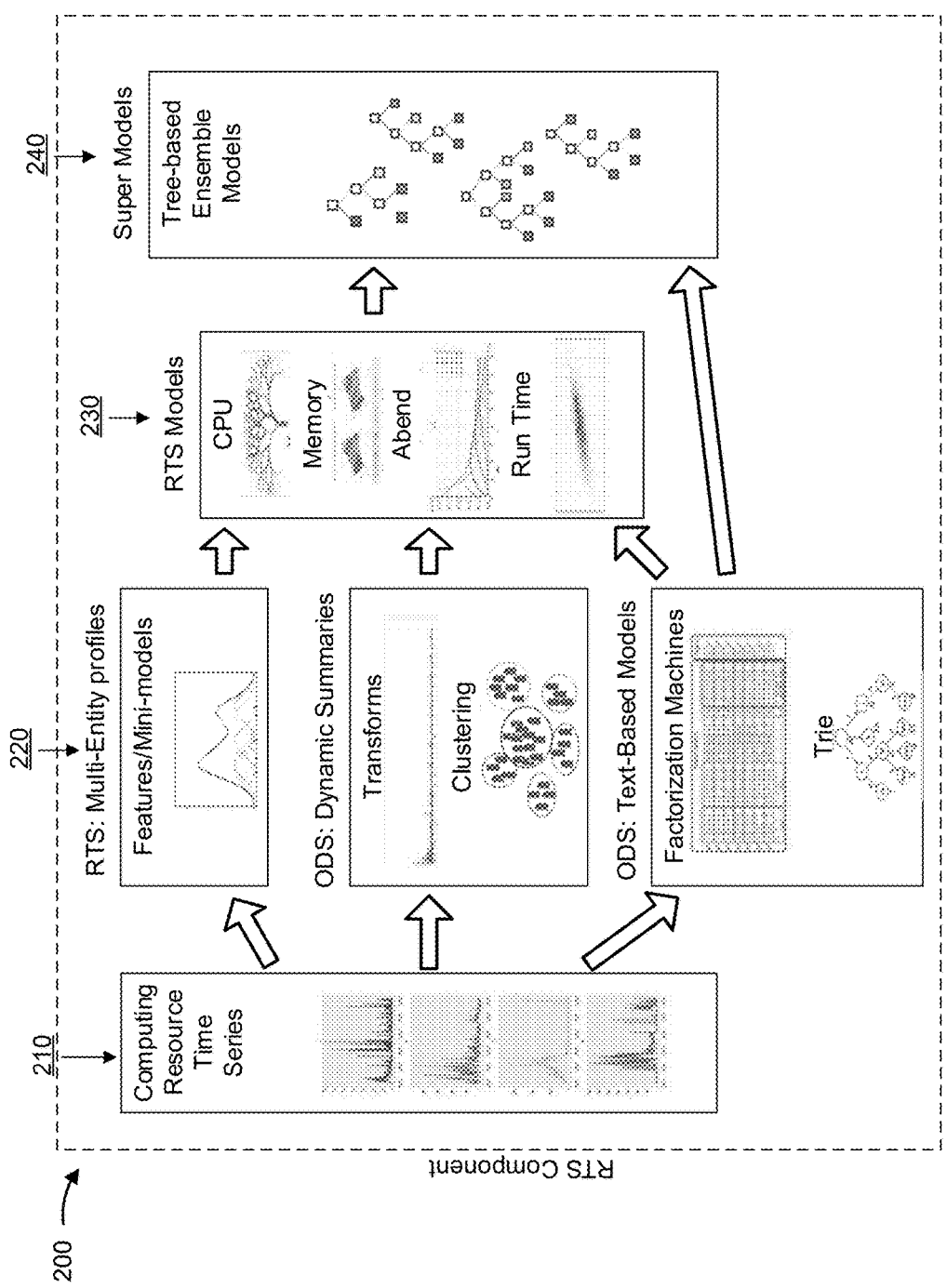
FIG. 2 is a diagram of an example implementation described herein.

FIG. 2 is a diagram of an example implementation 200 described herein. FIG. 2 shows example models that the RTS component of the computing resource allocation platform may generate and/or use.

As shown by reference number 210, the RTS component may perform various analyses for the computing resources (e.g., based on performance data gathered during performance of a job, based on historical data for the job, and/or the like). For example, the RTS component may perform various analyses for a particular time period.

As shown by reference number 220, the RTS component may generate various models from the time series input data. For example, the RTS component may generate multi-entity profiles from data stored in the RTS data structure (e.g., may generate a profile of data for individuals associated with the organization, for projects associated with the organization, and/or the like). Additionally, or alternatively, the RTS component may generate dynamic summaries and/or text-based models based on data stored in the ODS summary data structure. For example, the RTS component may generate a clustering model from data included in a summary stored in the ODS summary data structure (e.g., clustered by job, computing resource, individual, and/or the like). Additionally, or alternatively, and as another example, the ODS component may generate a trie of terms extracted from a summary, a factorization model, and/or a report stored in the ODS summary data structure.

As shown by reference number 230, the RTS component may generate one or more models from one or more of the models described with regard to reference number 220. For example, the RTS component may generate knowledge graphs, run-time graphs, abend probability graphs, and/or the like based on the models generated from the data stored in the RTS data structure and/or the ODS summary data structure. As shown by reference number 240, the RTS component may combine these and/or other models into a super model. For example, the super model may include a tree-based ensemble model and the RTS component may use the super model to improve an accuracy of determinations related to resource allocation, to improve identification of issues related to performance of a job, to determine a score for a predicted allocation of computing resources, and/or the like.

As indicated above, FIG. 2 is provided merely as an example. Other examples are possible and may differ from what was described with regard to FIG. 2.

Figure 3:
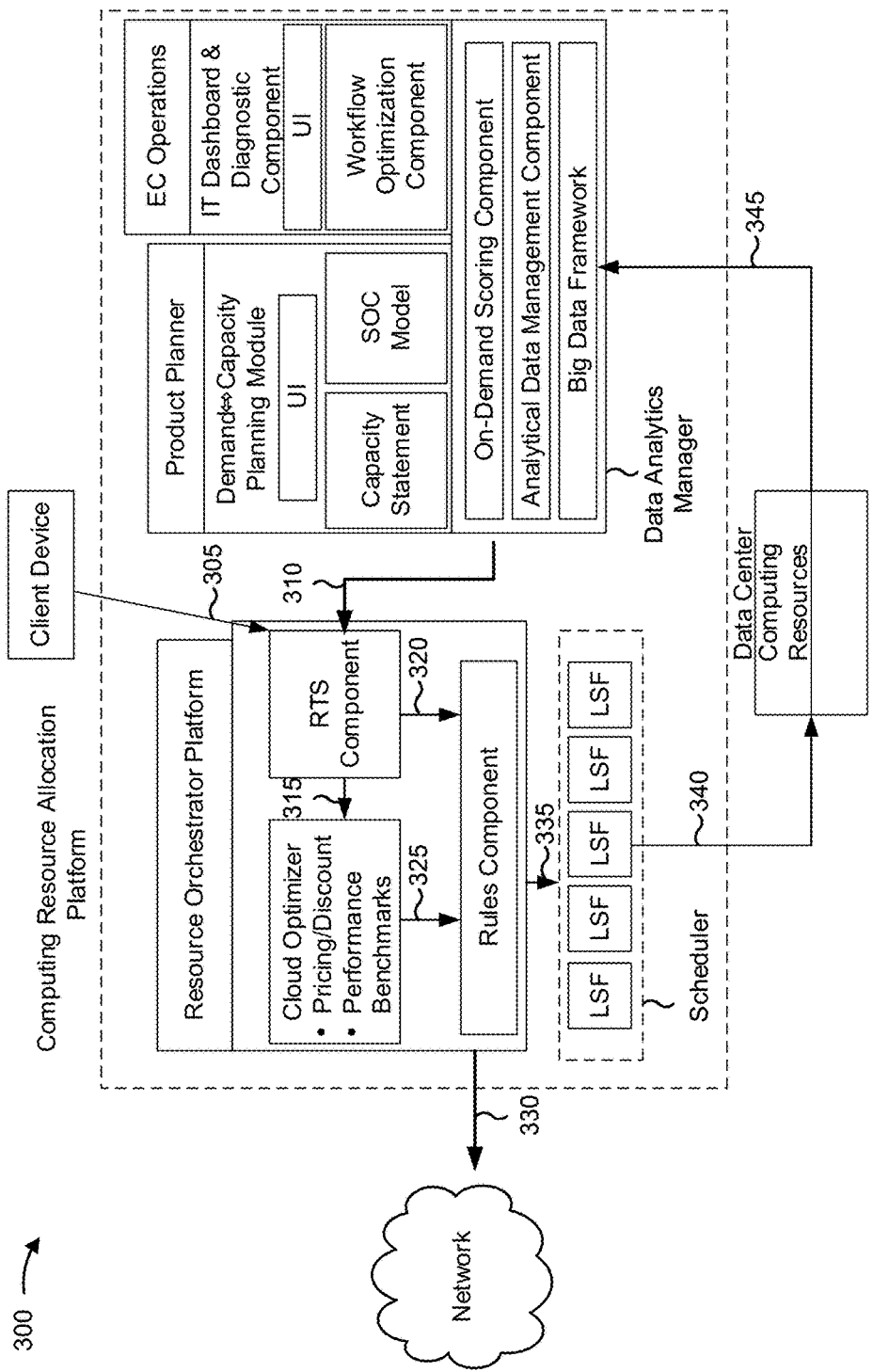
FIG. 3 is a diagram of an example implementation described herein.

FIG. 3 is a diagram of an example implementation 300 described herein. FIG. 3 shows an example architecture and/or functioning of a computing resource allocation platform.

As shown by reference number 305, the RTS component may receive a computing resource request in a manner similar to that described elsewhere herein. As shown by reference number 310, the RTS component may receive data related to demand/supply predictions for computing resources during a time period, data related to a workflow for processing a job, historical performance data for a job, historical data for various parameters identified in the computing resource request, and/or the like. For example, an RTS component, similar to that described elsewhere herein, may use this data to determine an allocation of computing resources for a job. As shown by reference number 315, the RTS component may communicate with a cloud optimizer to obtain data related to a service-level for performance of the job, performance thresholds for performance of the job, and/or the like, which the RTS component may incorporate into determining an allocation of the computing resources.

As shown by reference numbers 320 and 325, a rules component, similar to that described elsewhere herein, may receive data from the cloud optimizer and/or the RTS component and may schedule the job in a manner similar to that described elsewhere herein. For example, the rules component may schedule the job according to the allocation and/or according to restrictions indicated in data from the cloud optimizer (e.g., pricing restrictions, service-level restrictions, and/or the like). In some implementations, and as shown by reference number 330, the rules component may communicate with a network to utilize a cloud platform and/or cloud resources (e.g., provided by a third party) to perform these determinations.

As shown by reference number 335, the rules component may communicate with one or more instances of a load sharing facility (LSF). For example, a load sharing facility may include one or more devices and/or components capable of scheduling and/or executing a job. In some implementations, the scheduler described elsewhere herein may be the LSF, may include the LSF, and/or the like.

As shown by reference number 340, the one or more LSFs may communicate with a data center. For example, the one or more LSFs may communicate with the data center to reserve computing resources for the job, to reserve computing resources according to the allocation, to cause the computing resources to perform the job, and/or the like, in a manner similar to that described elsewhere herein. As specific examples, the computing resources may include memory resources, CPUs, run-time resources, cloud resources, and/or the like based on predictions determined by the computing resource allocation platform.

As shown by reference number 345, the data center may provide, to the computing resource platform (e.g., the data analytics manager), performance data related to performance of the job and/or data center data related to the data center. For example, the performance data and/or the data center data may include power usage effectiveness (PUE) data, power data, rack scale density data, compute infrastructure and/or performance data, and/or the like. In some implementations, the data analytics manager may determine this data from raw data output from the data center (e.g., real-time data related to operations of the data center). In some implementations, the data analytics manager may process data from the data center in a manner similar to that described elsewhere herein to determine values for metrics related to the data center and/or to performance of the job. For example, the data analytics manager may determine an amount of memory resources being consumed in association with performing the job, a quantity of CPUs being used in association with performing the job, storage utilization for the job, license reservations associated with performance of the job, start and/or finish times for the job, and/or the like.

Additionally, or alternatively, the data analytics manager may determine an accuracy of predictions related to performance of the job that the computing resource allocation platform determined (e.g., predictions on which an allocation of computing resources for the job was based). For example, the data analytics manager may determine a run-time prediction accuracy (e.g., an extent to which a predicted run-time matches an actual run-time), a CPU utilization accuracy (e.g., an extent to which a predicted quantity of CPUs needed for the job matches an actual quantity of CPUs needed for the job), a memory prediction accuracy (e.g., an extent to which a predicted amount of memory resources needed for the job matches an actual amount of memory resources needed for the job), and/or the like. In some implementations, the data analytics manager may use these determinations to update a machine learning model used to determine resource allocations for jobs. This improves future predictions of resource allocations and/or conserves computing resources that would otherwise be consumed due to inaccurate predictions.

As indicated above, FIG. 3 is provided merely as an example. Other examples are possible and may differ from what was described with regard to FIG. 3.

Figure 4:
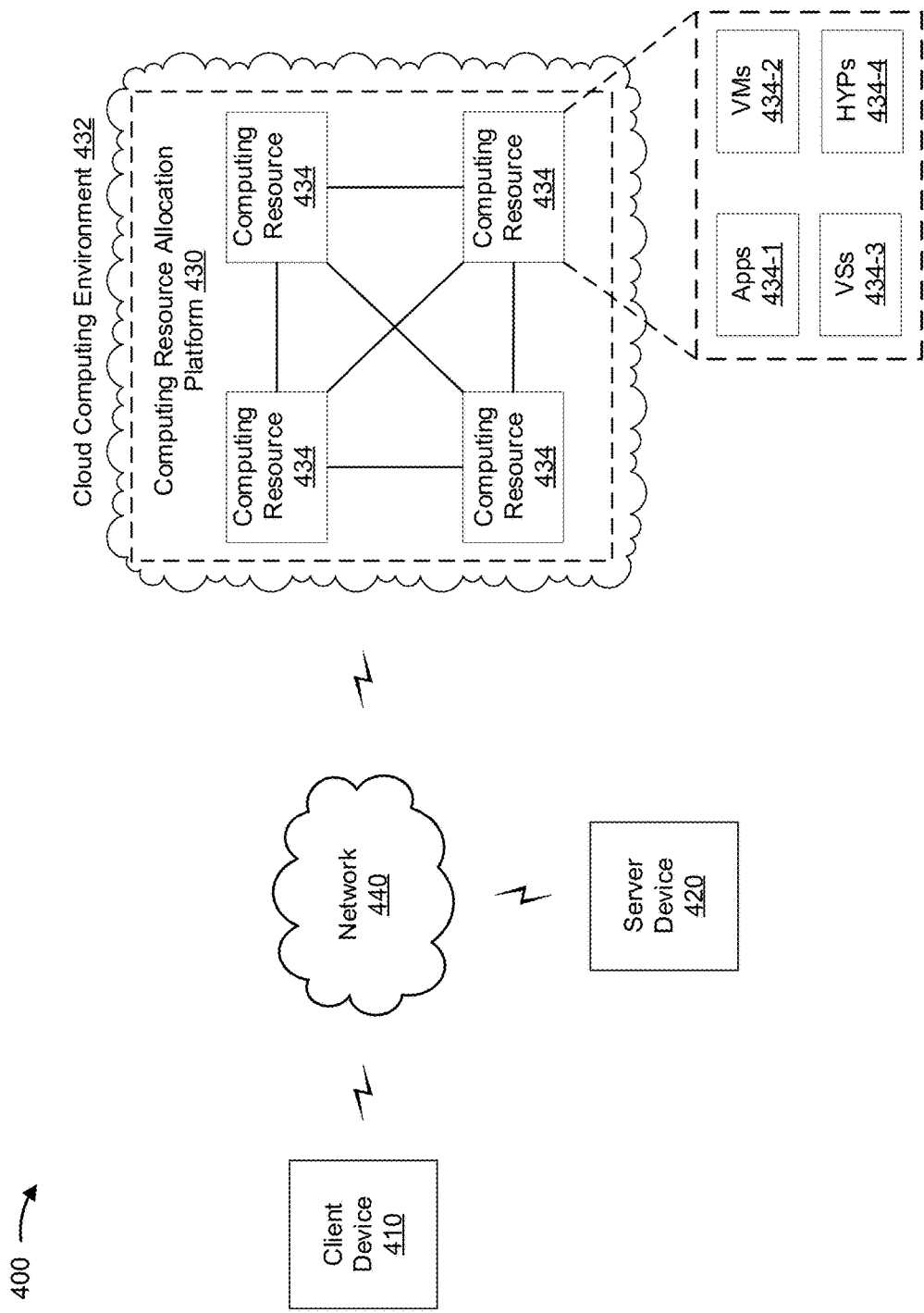
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a client device 410, a server device 420, a computing resource allocation platform 430 in a cloud computing environment 432 that includes a set of computing resources 434, and a network 440. Devices of environment 400 may interconnect via wired connections, wireless connections, or a combination of wired and wireless connections.

Client device 410 includes one or more devices capable of receiving, generating, storing, processing, and/or providing information associated with a computing resource request. For example, client device 410 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 410 may provide, to computing resource allocation platform 430, a computing resource request for a job, as described elsewhere herein.

Server device 420 includes one or more devices capable of receiving, generating storing, processing, and/or providing information associated with a computing resource request. For example, server device 420 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 420 may include a communication interface that allows server device 420 to receive information from and/or transmit information to other devices in environment 400. In some implementations, server device 420 may be a physical device implemented within a housing, such as a chassis. In some implementations, server device 420 may be a virtual device implemented by one or more computer devices of a cloud computing environment or a data center. In some implementations, server device 420 may provide, to computing resource allocation platform 430, a prediction for an allocation of computing resource to be used for performance of a job, as described elsewhere herein.

Computing resource allocation platform 430 includes one or more devices capable of receiving, generating, storing, processing, and/or providing information related to computing resource requests. For example, computing resource allocation platform 430 may include a cloud server or a group of cloud servers. In some implementations, computing resource allocation platform 430 may be designed to be modular such that certain software components can be swapped in or out depending on a particular need. As such, computing resource allocation platform 430 may be easily and/or quickly reconfigured for different uses.

In some implementations, as shown in FIG. 4, computing resource allocation platform 430 may be hosted in cloud computing environment 432. Notably, while implementations described herein describe computing resource allocation platform 430 as being hosted in cloud computing environment 432, in some implementations, computing resource allocation platform 430 may not be cloud-based (i.e., may be implemented outside of a cloud computing environment) or may be partially cloud-based.

Cloud computing environment 432 includes an environment that hosts computing resource allocation platform 430. Cloud computing environment 432 may provide computation, software, data access, storage, and/or other services that do not require end-user knowledge of a physical location and configuration of a system and/or a device that hosts computing resource allocation platform 430. As shown, cloud computing environment 432 may include a group of computing resources 434 (referred to collectively as "computing resources 434" and individually as "computing resource 434").

Computing resource 434 includes one or more personal computers, workstation computers, server devices, or another type of computation and/or communication device. In some implementations, computing resource 434 may host computing resource allocation platform 430. The cloud resources may include compute instances executing in computing resource 434, storage devices provided in computing resource 434, data transfer devices provided by computing resource 434, etc. In some implementations, computing resource 434 may communicate with other computing resources 434 via wired connections, wireless connections, or a combination of wired and wireless connections.

As further shown in FIG. 4, computing resource 434 may include a group of cloud resources, such as one or more applications ("APPs") 434-1, one or more virtual machines ("VMs") 434-2, one or more virtualized storages ("VSs") 434-3, or one or more hypervisors ("HYPs") 434-4.

Application 434-1 includes one or more software applications that may be provided to or accessed by one or more devices of environment 400. Application 434-1 may eliminate a need to install and execute the software applications on devices of environment 400. For example, application 434-1 may include software associated with computing resource allocation platform 430 and/or any other software capable of being provided via cloud computing environment 432. In some implementations, one application 434-1 may send/receive information to/from one or more other applications 434-1, via virtual machine 434-2. In some implementations, application 434-1 may include a software application associated with one or more databases and/or operating systems. For example, application 434-1 may include an enterprise application, a functional application, an analytics application, and/or the like.

Virtual machine 434-2 includes a software implementation of a machine (e.g., a computer) that executes programs like a physical machine. Virtual machine 434-2 may be either a system virtual machine or a process virtual machine, depending upon use and degree of correspondence to any real machine by virtual machine 434-2. A system virtual machine may provide a complete system platform that supports execution of a complete operating system ("OS"). A process virtual machine may execute a single program, and may support a single process. In some implementations, virtual machine 434-2 may execute on behalf of a user (e.g., a user of client device 410), and may manage infrastructure of cloud computing environment 432, such as data management, synchronization, or long-duration data transfers.

Virtualized storage 434-3 includes one or more storage systems and/or one or more devices that use virtualization techniques within the storage systems or devices of computing resource 434. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 434-4 provides hardware virtualization techniques that allow multiple operating systems (e.g., "guest operating systems") to execute concurrently on a host computer, such as computing resource 434. Hypervisor 434-4 may present a virtual operating platform to the guest operating systems, and may manage the execution of the guest operating systems. Multiple instances of a variety of operating systems may share virtualized hardware resources.

Network 440 includes one or more wired and/or wireless networks. For example, network 440 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
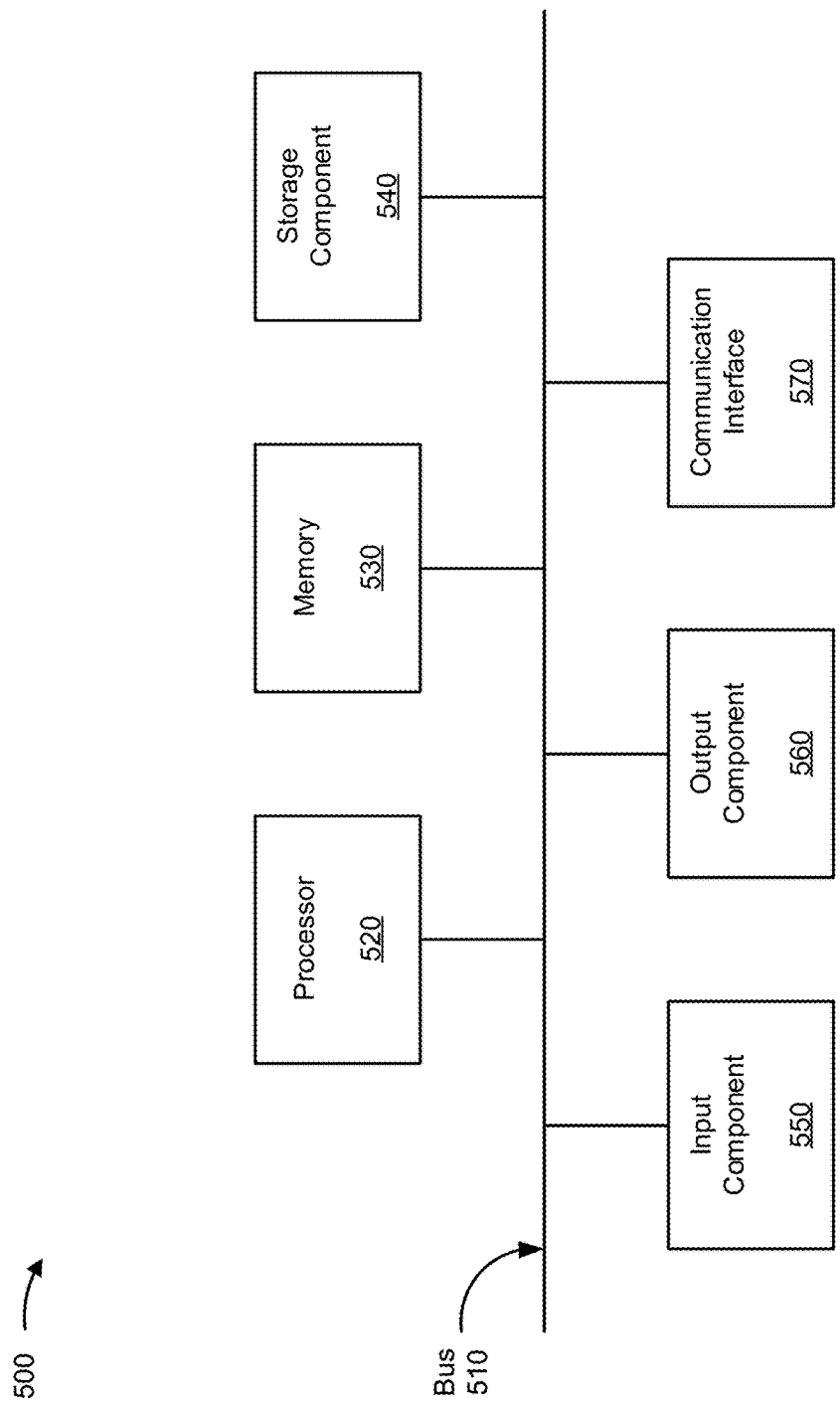
FIG. 5 is a diagram of example components of one or more devices of FIG. 4.

FIG. 5 is a diagram of example components of a device 500. Device 500 may correspond to client device 410, server device 420, computing resource allocation platform 430, and/or computing resource 434. In some implementations, client device 410, server device 420, computing resource allocation platform 430, and/or computing resource 434 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
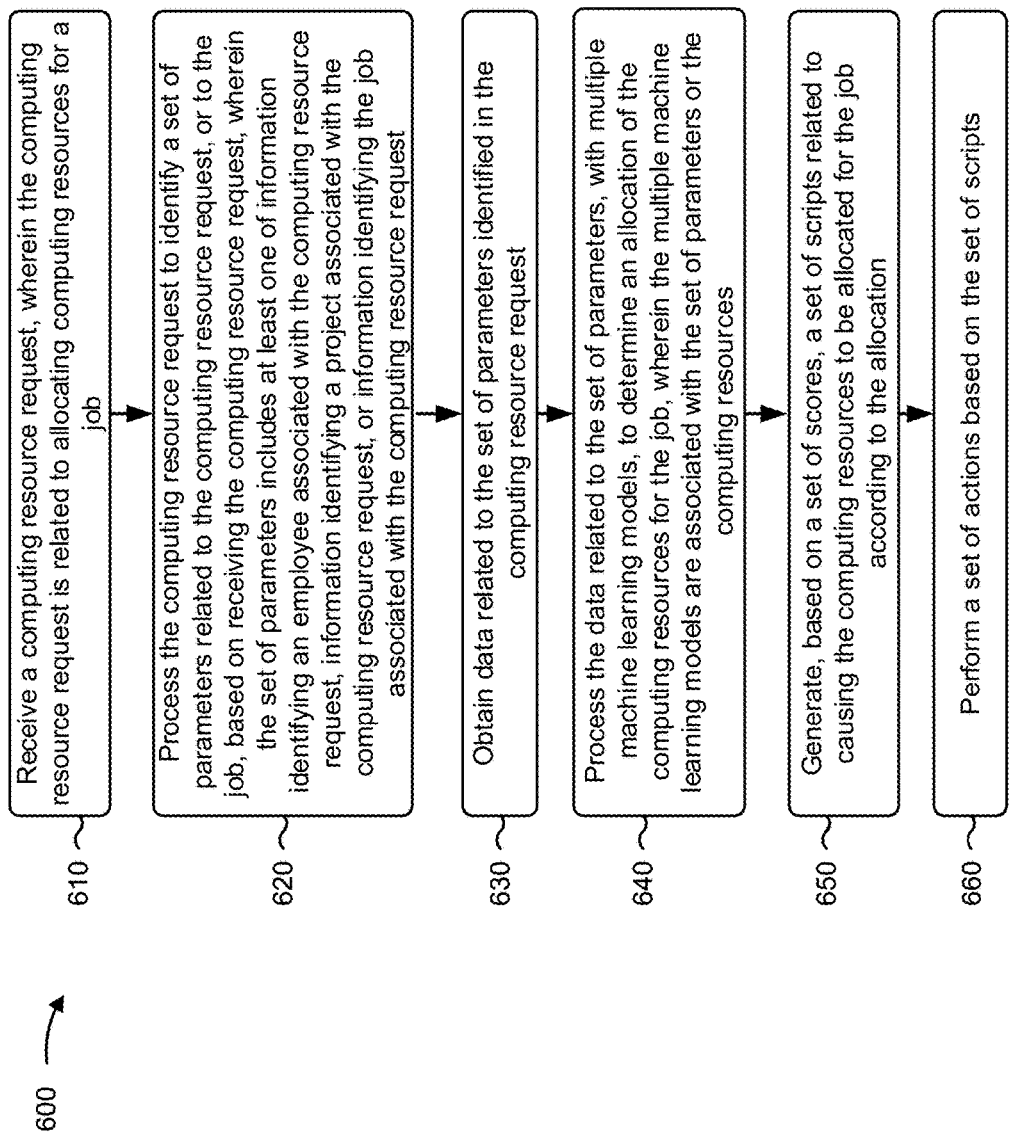
FIG. 6 is a flow chart of an example process for determining an allocation of computing resources for a job.

FIG. 6 is a flow chart of an example process 600 for determining an allocation of computing resources for a job. In some implementations, one or more process blocks of FIG. 6 may be performed by a computing resource allocation platform (e.g., computing resource allocation platform 430). In some implementations, one or more process blocks of FIG. 6 may be performed by another device or a group of devices separate from or including the computing resource allocation platform, such as a client device (e.g., client device 410) or a server device (e.g., server device 420).

As shown in FIG. 6, process 600 may include receiving a computing resource request, wherein the computing resource request is related to allocating computing resources for a job (block 610). For example, the computing resource allocation platform (e.g., computing resource allocation platform 430 using computing resource 434, processor 520, input component 550, communication interface 570, and/or the like) may receive a computing resource request, in a manner that is the same as or similar to that described elsewhere herein. In some implementations, the computing resource request may be related to allocating computing resources for a job.

As further shown in FIG. 6, process 600 may include processing the computing resource request to identify a set of parameters related to the computing resource request, or to the job, based on receiving the computing resource request, wherein the set of parameters includes at least one of information identifying an employee associated with the computing resource request, information identifying a project associated with the computing resource request, or information identifying the job associated with the computing resource request (block 620). For example, the computing resource allocation platform (e.g., computing resource allocation platform 430 using computing resource 434, processor 520, memory 530, storage component 540, and/or the like) may process the computing resource request to identify a set of parameters related to the computing resource request, or to the job, based on receiving the computing resource request, in a manner that is the same as or similar to that described elsewhere herein. In some implementations, the set of parameters may include at least one of information identifying an employee associated with the computing resource request, information identifying a project associated with the computing resource request, or information identifying the job associated with the computing resource request.

As further shown in FIG. 6, process 600 may include obtaining data related to the set of parameters identified in the computing resource request (block 630). For example, the computing resource allocation platform (e.g., computing resource allocation platform 430 using computing resource 434, processor 520, memory 530, storage component 540, input component 550, communication interface 570, and/or the like) may obtain data related to the set of parameters identified in the computing resource request, in a manner that is the same as or similar to that described elsewhere herein.

As further shown in FIG. 6, process 600 may include processing the data related to the set of parameters, with multiple machine learning models, to determine an allocation of the computing resources for the job, wherein the multiple machine learning models are associated with the set of parameters or the computing resources (block 640). For example, the computing resource allocation platform (e.g., computing resource allocation platform 430 using computing resource 434, processor 520, memory 530, storage component 540, and/or the like) may process the data related to the set of parameters, with multiple machine learning models, to determine an allocation of the computing resources for the job, in a manner that is the same as or similar to that described elsewhere herein. In some implementations, the multiple machine learning models are associated with the set of parameters or the computing resources.

As further shown in FIG. 6, process 600 may include generating, based on a set of scores, a set of scripts related to causing the computing resources to be allocated for the job according to the allocation (block 650). For example, the computing resource allocation platform (e.g., computing resource allocation platform 430 using computing resource 434, processor 520, memory 530, storage component 540, and/or the like) may generate, based on a set of scores, a set of scripts related to causing the computing resources to be allocated for the job according to the allocation, in a manner that is the same as or similar to that described elsewhere herein.

As further shown in FIG. 6, process 600 may include performing a set of actions based on the set of scripts (block 660). For example, the computing resource allocation platform (e.g., computing resource allocation platform 430 using computing resource 434, processor 520, memory 530, storage component 540, output component 560, communication interface 570, and/or the like) may perform a set of actions based on the set of scripts, in a manner that is the same as or similar to that described elsewhere herein.

Process 600 may include additional implementations, such as any single implementation or any combination of implementations described below and/or in connection with one or more other processes described elsewhere herein.

In some implementations, the computing resource allocation platform may receive the computing resource request from a client device. In some implementations, the computing resource request may be received by a rules component associated with a device. In some implementations, the computing resource allocation platform may process the computing resource request to identify at least one of a set of terms included in text associated with the computing resource request, a set of identifiers included in the text or associated with the computing resource request, or a set of selections on a form associated with the computing resource request. In some implementations, the computing resource allocation platform may identify the set of parameters based on the set of terms, the set of identifiers, or the set of selections.

In some implementations, the computing resource allocation platform may provide, to facilitate scheduling of the computing resources, information identifying the allocation from a scoring component associated with the device to a rules component associated with the device. In some implementations, the computing resource allocation platform may schedule, utilizing the rules component the computing resources for the job based on the allocation and after providing the information identifying the allocation to the rules component.

In some implementations, the computing resource allocation platform may select, from a data structure, a set of instructions associated with the computing resources to be used for the job. In some implementations, the set of instructions may be used to generate the set of scripts. In some implementations, the computing resource allocation platform may insert, into the set of instructions, information identifying at least one of the allocation of the computing resources, or specific computing resources within a data center to be allocated for the job.

In some implementations, the computing resource allocation platform may provide the set of scripts to the computing resources to cause the computing resources to perform the job. In some implementations, the computing resource allocation platform may provide, for display, information that identifies at least one of the allocation of the computing resources, or a completion status of the job.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
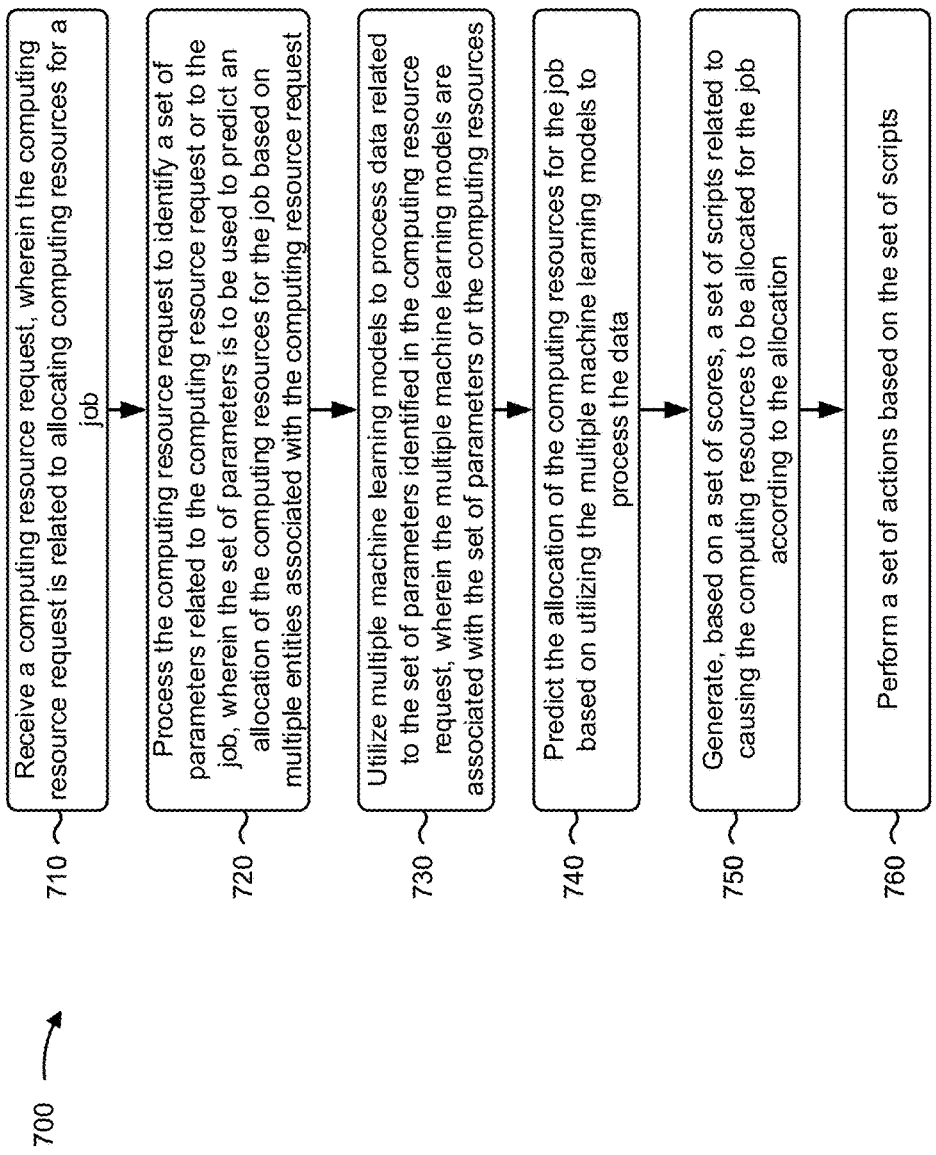
FIG. 7 is a flow chart of an example process for determining an allocation of computing resources for a job.

FIG. 7 is a flow chart of an example process 700 for determining an allocation of computing resource for a job. In some implementations, one or more process blocks of FIG. 7 may be performed by a computing resource allocation platform (e.g., computing resource allocation platform 430). In some implementations, one or more process blocks of FIG. 7 may be performed by another device or a group of devices separate from or including the computing resource allocation platform, such as a client device (e.g., client device 410) or a server device (e.g., server device 420).

As shown in FIG. 7, process 700 may include receiving a computing resource request, wherein the computing resource request is related to allocating computing resources for a job (block 710). For example, the computing resource allocation platform (e.g., computing resource allocation platform 430 using processor 520, memory 530, storage component 540, input component 550, communication interface 570, and/or the like) may receive a computing resource request, in a manner that is the same as or similar to that described elsewhere herein. In some implementations, the computing resource request may be related to allocating computing resources for a job.

As further shown in FIG. 7, process 700 may include processing the computing resource request to identify a set of parameters related to the computing resource request or to the job, wherein the set of parameters is to be used to predict an allocation of the computing resources for the job based on multiple entities associated with the computing resource request (block 720). For example, the computing resource allocation platform (e.g., computing resource allocation platform 430 using computing resource 434, processor 520, and/or the like) may process the computing resource request to identify a set of parameters related to the computing resource request or to the job based on multiple entities associated with the computing resource request, in a manner that is the same as or similar to that described elsewhere herein. In some implementations, the set of parameters may be used to predict an allocation of the computing resources for the job.

As further shown in FIG. 7, process 700 may include utilizing multiple machine learning models to process data related to the set of parameters identified in the computing resource request, wherein the multiple machine learning models are associated with the set of parameters or the computing resources (block 730). For example, the computing resource allocation platform (e.g., computing resource 434, processor 520, and/or the like) may utilize multiple machine learning models to process data related to the set of parameters identified in the computing resource request, in a manner that is the same as or similar to that described elsewhere herein. In some implementations, the multiple machine learning models are associated with the set of parameters or the computing resources.

As further shown in FIG. 7, process 700 may include predicting the allocation of the computing resources for the job based on utilizing the multiple machine learning models to process the data (block 740). For example, the computing resource allocation platform (e.g., computing resource allocation platform 430 using computing resource 434, processor 520, and/or the like) may predict the allocation of the computing resources for the job based on utilizing the multiple machine learning models to process the data, in a manner that is the same as or similar to that described elsewhere herein.

As further shown in FIG. 7, process 700 may include generating, based on a set of scores, a set of scripts related to causing the computing resources to be allocated for the job according to the allocation (block 750). For example, the computing resource allocation platform (e.g., computing resource allocation platform 430 using computing resource 434, processor 520, memory 530, storage component 540, and/or the like) may generate, based on a set of scores, a set of scripts related to causing the computing resources to be allocated for the job according to the allocation, in a manner that is the same as or similar to that described elsewhere herein.

As further shown in FIG. 7, process 700 may include performing a set of actions based on the set of scripts (block 760). For example, the computing resource allocation platform (e.g., computing resource allocation platform 430 using computing resource 434, processor 520, memory 530, storage component 540, output component 560, communication interface 570, and/or the like) may perform a set of actions based on the set of scripts, in a manner that is the same as or similar to that described elsewhere herein.

Process 700 may include additional implementations, such as any single implementation or any combination of implementations described below and/or in connection with one or more other processes described elsewhere herein.

In some implementations, the computing resource allocation platform may receive the computing resource request using a rules component associated with the device. In some implementations, the computing resource allocation platform may provide, via an application programming interface (API), the computing resource request from the rules component to a scoring component for processing after receiving the computing resource request.

In some implementations, the set of parameters may include at least one of information indicating an individual that submitted the computing resource request, information indicating a project associated with the computing resource request or the job, or information indicating the job associated with the computing resource request. In some implementations, the computing resource allocation platform may obtain the data related to the set of parameters from one or more data structures that store historical data related to one or more other jobs, or performance data related to a performance of the job.

In some implementations, the computing resource allocation platform may select a set of instructions from a set of template instructions based on the allocation of the computing resources and may modify the set of instructions based on the allocation of the computing resources. In some implementations, the computing resource allocation platform may generate the set of scripts based on modifying the set of instructions.

In some implementations, the computing resource allocation platform may gather performance data related to a performance of the job by the computing resources after performing the set of actions. In some implementations, the performance data may identify at least one of an amount of time elapsed or remaining for completion of the job, an amount of the job completed or remaining to be completed, a load of the computing resources during the performance of the job, and/or the like. In some implementations, the computing resource allocation platform may predict a re-allocation of the computing resources for the job after gathering the performance data.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for determining an allocation of computing resources for a job. In some implementations, one or more process blocks of FIG. 8 may be performed by a computing resource allocation platform (e.g., computing resource allocation platform 430). In some implementations, one or more process blocks of FIG. 8 may be performed by another device or a group of devices separate from or including the computing resource allocation platform, such as a client device (e.g., client device 410) or a server device (e.g., server device 420).

As shown in FIG. 8, process 800 may include receiving a computing resource request, wherein the computing resource request is related to allocating computing resources for a job (block 810). For example, the computing resource allocation platform (e.g., computing resource allocation platform 430 using computing resource 434, processor 520, memory 530, storage component 540, input component 550, communication interface 570, and/or the like) may receive a computing resource request, in a manner that is the same as or similar to that described elsewhere herein. In some implementations, the computing resource request may be related to allocating computing resources for a job.

As further shown in FIG. 8, process 800 may include processing the computing resource request to identify a set of parameters related to the computing resource request or to the job, wherein the set of parameters includes at least one of a parameter indicating an employee associated with the computing resource request, a parameter indicating a project associated with the computing resource request or the job, or a parameter indicating the job associated with the computing resource request (block 820). For example, the computing resource allocation platform (e.g., computing resource allocation platform 430 using computing resource 434, processor 520, and/or the like) may process the computing resource request to identify a set of parameters related to the computing resource request or to the job, in a manner that is the same as or similar to that described elsewhere herein. In some implementations, the set of parameters may include at least one of a parameter indicating an employee associated with the computing resource request, a parameter indicating a project associated with the computing resource request or the job, or a parameter indicating the job associated with the computing resource request.

As further shown in FIG. 8, process 800 may include receiving data related to the set of parameters identified in the computing resource request (block 830). For example, the computing resource allocation platform (e.g., computing resource allocation platform 430 using computing resource 434, processor 520, input component 550, communication interface 570, and/or the like) may receive data related to the set of parameters identified in the computing resource request, in a manner that is the same as or similar to that described elsewhere herein.

As further shown in FIG. 8, process 800 may include processing the data related to the set of parameters, with multiple machine learning models, to determine an allocation of the computing resources, wherein the multiple machine learning models are associated with the set of parameters or the computing resources (block 840). For example, the computing resource allocation platform (e.g., computing resource allocation platform 430 using computing resource 434, processor 520, and/or the like) may process the data related to the set of parameters, with a machine learning model, to determine an allocation of the computing resources, in a manner that is the same as or similar to that described elsewhere herein. In some implementations, the multiple machine learning models are associated with the set of parameters or the computing resources.

As further shown in FIG. 8, process 800 may include generating, based on a set of scores, a set of scripts to be executed by a device in association with allocating the computing resources according to the allocation (block 850). For example, the computing resource allocation platform (e.g., computing resource allocation platform 430 using computing resource 434, processor 520, memory 530, storage component 540, and/or the like) may generate, based on a set of scores, a set of scripts to be executed by a device in association with allocating the computing resources according to the allocation, in a manner that is the same as or similar to that described elsewhere herein.

As further shown in FIG. 8, process 800 may include performing a set of actions based on the set of scripts (block 860). For example, the computing resource allocation platform (e.g., computing resource allocation platform 430 using computing resource 434, processor 520, memory 530, storage component 540, output component 560, communication interface 570, and/or the like) may perform a set of actions based on the set of scripts, in a manner that is the same as or similar to that described elsewhere herein.

Process 800 may include additional implementations, such as any single implementation or any combination of implementations described below and/or in connection with one or more other processes described elsewhere herein.

In some implementations, the computing resource allocation platform may provide, to multiple data sources, a respective query for the data related to the set of parameters after processing the computing resource request. In some implementations, the computing resource allocation platform may receive the data related to the set of parameters after providing the respective query to the multiple data sources.

In some implementations, the computing resource allocation platform may perform a prediction of the allocation of the computing resources based on at least one of historical data related to the set of parameters, or performance data related to a performance of the job or of one or more other jobs. In some implementations, the computing resource allocation platform may generate the set of scripts based on the allocation of the computing resources. In some implementations, the set of scripts may cause the device to allocate the computing resources according to the allocation.

In some implementations, the computing resource allocation platform may gather performance data related to a performance of the job after performing the set of actions. In some implementations, the computing resource allocation platform may process the performance data, using the multiple machine learning models, to determine that the computing resources need to be re-allocated during the performance of the job. In some implementations, the computing resource allocation platform may perform another set of actions related to re-allocating the computing resources after processing the performance data.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In this way, computing resource allocation platform 430 may determine an allocation of computing resources for a job. For example, computing resource allocation platform 430 may determine the allocation for thousands, millions, or more computing resource requests, utilizing various types of machine learning models, and/or the like. This provides a tool that can be used to determine an allocation of computing resources in a manner that is different than a human actor. In addition, this provides a more accurate determination of an allocation relative to other techniques, thereby reducing or eliminating waste related to under-estimations and/or over-estimations of computing resources needed for a job. Further, this reduces an amount of time needed to determine an allocation of computing resources for a job, thereby increasing an efficiency of determining an allocation of computing resources for a job. Further, this provides a tool that can process computing resource requests at a scale not previously possible using other techniques and/or not possible by a human actor.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, a computing resource request,
wherein the computing resource request is related to allocating computing resources for a job;
processing, by the device, the computing resource request to identify a set of parameters related to the computing resource request, or to the job, based on receiving the computing resource request,
wherein the set of parameters includes at least one of:
information identifying an employee associated with the computing resource request,
information identifying a project associated with the computing resource request, or
information identifying the job associated with the computing resource request;
obtaining, by the device, data related to the set of parameters identified in the computing resource request;
processing, by the device, the data related to the set of parameters, with multiple machine learning models, to determine an allocation of the computing resources for the job based on a predicted amount of the computing resources needed for the job,
wherein the multiple machine learning models are associated with the set of parameters or the computing resources;
generating, by the device and based on a set of scores, a set of scripts related to causing the computing resources to be allocated for the job according to the allocation of the computing resources for the job;
performing, by the device, a set of actions based on the set of scripts;
gathering, by the device, performance data related to a performance of the job by the computing resources after performing at least a portion of the set of actions, the performance data indicating an actual consumption of the computing resources during performance of the job; and
adjusting, by the device and during performance of the job, the allocation of the computing resources for the job based on a deviation between the predicted amount of the computing resources needed for the job and the actual consumption of the computing resources during performance of the job.

2. The method of claim 1, wherein receiving the computing resource request comprises:
receiving the computing resource request from a client device,
wherein the computing resource request is received by a rules component associated with the device.

3. The method of claim 1, wherein processing the computing resource request comprises:
processing the computing resource request to identify at least one of:
a set of terms included in text associated with the computing resource request,
a set of identifiers included in the text or associated with the computing resource request, or
a set of selections on a form associated with the computing resource request; and
identifying the set of parameters based on the set of terms, the set of identifiers, or the set of selections.

4. The method of claim 1, further comprising:
providing, to facilitate scheduling of the computing resources, information identifying the allocation from a scoring component associated with the device to a rules component associated with the device; and
scheduling, utilizing the rules component, the computing resources for the job based on the allocation and after providing the information identifying the allocation to the rules component.

5. The method of claim 1, further comprising:
selecting, from a data structure, a set of instructions associated with the computing resources to be used for the job,
wherein the set of instructions is to be used to generate the set of scripts; and
inserting, into the set of instructions, information identifying at least one of:
the allocation of the computing resources, or
specific computing resources within a data center to be allocated for the job.

6. The method of claim 1, wherein performing the set of actions comprises:
providing the set of scripts to the computing resources to cause the computing resources to perform the job.

7. The method of claim 1, wherein performing the set of actions comprises:
providing, for display, information that identifies at least one of:
the allocation of the computing resources, or
a completion status of the job.

8. A device, comprising:
one or more memories; and
one or more processors, communicatively coupled to the one or more memories, to:
receive a computing resource request,
wherein the computing resource request is related to allocating computing resources for a job;
process the computing resource request to identify a set of parameters related to the computing resource request or to the job,
wherein the set of parameters is to be used to predict an allocation of the computing resources for the job based on multiple entities associated with the computing resource request;

utilize multiple machine learning models to process data related to the set of parameters identified in the computing resource request,
wherein the multiple machine learning models are associated with the set of parameters or the computing resources;
predict the allocation of the computing resources for the job based on utilizing the multiple machine learning models to process the data;
generate, based on a set of scores, a set of scripts related to causing the computing resources to be allocated for the job according to the allocation of the computing resources for the job;
perform a set of actions based on the set of scripts;
gather performance data related to a performance of the job by the computing resources after performing at least a portion of the set of actions,
the performance data indicating an actual consumption of the computing resources during performance of the job; and
adjust, during performance of the job, the allocation of the computing resources for the job based on a deviation between the predicted allocation of the computing resources needed for the job and the actual consumption of the computing resources during performance of the job.

9. The device of claim 8, wherein the one or more processors, when receiving the computing resource request, are to:
receive the computing resource request using a rules component associated with the device; and
wherein the one or more processors are further to:
provide, via an application programming interface (API), the computing resource request from the rules component to a scoring component for processing after receiving the computing resource request.

10. The device of claim 8, wherein the set of parameters includes at least one of:
information indicating an individual that submitted the computing resource request,
information indicating a project associated with the computing resource request or the job, or
information indicating the job associated with the computing resource request.

11. The device of claim 8, wherein the one or more processors are further to:
obtain the data related to the set of parameters from one or more data structures that store:
historical data related to one or more other jobs, or
performance data related to a performance of the job.

12. The device of claim 8, wherein the one or more processors are further to:
select a set of instructions from a set of template instructions based on the allocation of the computing resources;
modify the set of instructions based on the allocation of the computing resources; and
wherein the one or more processors, when generating the set of scripts, are to:
generate the set of scripts based on modifying the set of instructions.

13. The device of claim 8,
wherein the performance data identifies at least one of:
an amount of time elapsed or remaining for completion of the job,
an amount of the job completed or remaining to be completed, or
a load of the computing resources during the performance of the job.

14. The device of claim 13, wherein the one or more processors are further to:
predict a re-allocation of the computing resources for the job after gathering the performance data.

15. A non-transitory computer-readable medium storing instructions, the instructions comprising:
one or more instructions that, when executed by one or more processors, cause the one or more processors to:
receive a computing resource request,
wherein the computing resource request is related to allocating computing resources for a job;
process the computing resource request to identify a set of parameters related to the computing resource request or to the job,
wherein the set of parameters includes at least one of:
a parameter indicating an employee associated with the computing resource request,
a parameter indicating a project associated with the computing resource request or the job, or
a parameter indicating the job associated with the computing resource request;
receive data related to the set of parameters identified in the computing resource request;
process the data related to the set of parameters, with multiple machine learning models, to determine an allocation of the computing resources based on a predicted amount of the computing resources needed for the job,
wherein the multiple machine learning models are associated with the set of parameters or the computing resources;
generate, based on a set of scores, a set of scripts to be executed by a device in association with allocating the computing resources according to the allocation of the computing resources for the job;
perform a set of actions based on the set of scripts;
gather performance data related to a performance of the job by the computing resources after performing at least a portion of the set of actions,
the performance data indicating an actual consumption of the computing resources during performance of the job; and
adjust during performance of the job, the allocation of the computing resources for the job based on a deviation between the predicted amount of the computing resources needed for the job and the actual consumption of the computing resources during performance of the job.

16. The non-transitory computer-readable medium of claim 15, wherein the one or more instructions, when executed by the one or more processors, further cause the one or more processors to:
provide, to multiple data sources, a respective query for the data related to the set of parameters after processing the computing resource request; and
wherein the one or more instructions, that cause the one or more processors to receive the data related to the set of parameters, cause the one or more processors to:
receive the data related to the set of parameters after providing the respective query to the multiple data sources.

17. The non-transitory computer-readable medium of claim 15, wherein the one or more instructions, that cause the one or more processors to process the data related to the set of parameters, cause the one or more processors to:
  perform a prediction of the allocation of the computing resources based on at least one of:
    historical data related to the set of parameters, or
    performance data related to a performance of the job or of one or more other jobs.

18. The non-transitory computer-readable medium of claim 15, wherein the one or more instructions, that cause the one or more processors to generate the set of scripts, cause the one or more processors to:
  generate the set of scripts based on the allocation of the computing resources,
    wherein the set of scripts is to cause the device to allocate the computing resources according to the allocation.

19. The non-transitory computer-readable medium of claim 15, wherein the one or more instructions, when executed by the one or more processors, further cause the one or more processors to:
  process the performance data, using the multiple machine learning models, to determine that the computing resources need to be re-allocated during the performance of the job.

20. The non-transitory computer-readable medium of claim 19, wherein the one or more instructions, when executed by the one or more processors, further cause the one or more processors to:
  perform another set of actions related to re-allocating the computing resources after processing the performance data.

* * * * *